US012462605B2

(12) United States Patent
Chen et al.

(10) Patent No.: US 12,462,605 B2
(45) Date of Patent: Nov. 4, 2025

(54) ASSESSING FACE IMAGE QUALITY FOR APPLICATION OF FACIAL RECOGNITION

(71) Applicant: Tencent Technology (Shenzhen) Company Limited, Guangdong (CN)

(72) Inventors: Xingyu Chen, Shenzhen (CN); Ruixin Zhang, Shenzhen (CN); Fuzhao Ou, Shenzhen (CN); Yuge Huang, Shenzhen (CN); Shaoxin Li, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 452 days.

(21) Appl. No.: 17/991,670

(22) Filed: Nov. 21, 2022

(65) Prior Publication Data

US 2023/0087657 A1 Mar. 23, 2023

Related U.S. Application Data

(63) Continuation of application No. PCT/CN2021/123252, filed on Oct. 12, 2021.

(30) Foreign Application Priority Data

Nov. 11, 2020 (CN) .......................... 202011255554.8

(51) Int. Cl.
*G06V 40/16* (2022.01)
*G06V 10/44* (2022.01)

(52) U.S. Cl.
CPC .......... *G06V 40/172* (2022.01); *G06V 10/443* (2022.01); *G06V 40/168* (2022.01)

(58) Field of Classification Search
CPC .. G06V 40/172; G06V 10/443; G06V 40/168; G06V 10/993; G06V 40/161;
(Continued)

(56) References Cited

U.S. PATENT DOCUMENTS

2016/0154994 A1 6/2016 Kim et al.

FOREIGN PATENT DOCUMENTS

| CN | 108171256 A | 6/2018 |
|---|---|---|
| CN | 108805048 A | 11/2018 |

(Continued)

OTHER PUBLICATIONS

International Search Report and Written Opinion in PCT/CN2021/123252, mailed on Jan. 10, 2022, 9 pages.

(Continued)

*Primary Examiner* — Wassim Mahrouka
(74) *Attorney, Agent, or Firm* — ARENTFOX SCHIFF LLP

(57) ABSTRACT

A face image quality assessment method includes acquiring a face image, and determining a similarity distribution distance of the face image, the similarity distribution distance including a distribution distance between an intra-person similarity distribution of the face image and an inter-person similarity distribution of the face image. The intra-person similarity distribution indicates a similarity distribution between the face image and a first-type image of a same person as the face image, and the inter-person similarity distribution indicates a similarity distribution between the face image and a second-type image of a different person from the face image. The method further includes determining image quality of the face image based on the similarity distribution distance of the face image.

20 Claims, 12 Drawing Sheets

(58) Field of Classification Search
CPC ......... G06T 7/0002; G06T 2207/30168; G06T 2207/30201
See application file for complete search history.

(56) References Cited

FOREIGN PATENT DOCUMENTS

| | | |
|---|---|---|
| CN | 110838119 A | 2/2020 |
| CN | 110866471 A | 3/2020 |
| CN | 111242097 A | 6/2020 |
| CN | 112381782 A | 2/2021 |

OTHER PUBLICATIONS

Extended European Search Report received for European Patent Application No. 21890865.5, mailed on Mar. 22, 2024, 6 pages.
OU et, al., "SDD-FIQA: Unsupervised Face Image Quality Assessment with Similarity Distribution Distance", 2021 IEEE/CVF Vision and Pattern Recognition (CVPR), Jun. 20, 2021, pp. 7666-7675.

ASSESSING FACE IMAGE QUALITY FOR APPLICATION OF FACIAL RECOGNITION

RELATED APPLICATIONS

This application is a continuation of International Application No. PCT/CN2021/123252, entitled "FACE IMAGE QUALITY ASSESSMENT METHOD AND APPARATUS, COMPUTER DEVICE AND STORAGE MEDIUM" and filed on Oct. 12, 2021, which claims priority to Chinese Patent Application No. 202011255554.8, entitled "FACE IMAGE QUALITY ASSESSMENT METHOD AND APPARATUS, COMPUTER DEVICE, AND STORAGE MEDIUM" and filed on Nov. 11, 2020. The entire disclosures of the prior applications are hereby incorporated by reference.

FIELD OF THE TECHNOLOGY

Embodiments of this application relate to the field of image processing technology, including a face image quality assessment method and apparatus, a computer device, and a storage medium.

BACKGROUND OF THE DISCLOSURE

Face recognition is increasingly widespread in society, and the quality of images for face recognition affects the accuracy of face recognition. Therefore, face image quality assessment plays a very important role in the practical application of face recognition.

In the related art, quality assessment of a face image is implemented by use of a face image quality assessment model. When the face image quality assessment model is trained, quality annotation of training samples is generally implemented manually, so as to implement the training of the face image quality assessment model.

However, in the above solution, a standard of face image quality is difficult to quantize objectively, so image quality is manually annotated not so accurately. As a result, the image quality annotation accuracy is low.

SUMMARY

The embodiments of this disclosure provide a face image quality assessment method and apparatus, a computer device, and a storage medium.

In an embodiment, a face image quality assessment method includes acquiring a face image, and determining a similarity distribution distance of the face image, the similarity distribution distance comprising a distribution distance between an intra-person similarity distribution of the face image and an inter-person similarity distribution of the face image. The intra-person similarity distribution indicates a similarity distribution between the face image and a first-type image of a same person as the face image, the inter-person similarity distribution indicates a similarity distribution between the face image and a second-type image of a different person from the face image. The method further includes determining image quality of the face image based on the similarity distribution distance of the face image.

In an embodiment, a face image quality assessment method includes acquiring sample images, the sample images including face image sets, each of the face image sets corresponding to a personal identity respectively. Each face image set includes at least two face images. The method further includes determining a similarity distribution distance of each of the sample images based on the respective sample image and a personal identity corresponding to a face image set of the respective sample image. The similarity distribution distance of the respective sample image includes a distribution distance between an intra-person similarity distribution of the respective sample image and an inter-person similarity distribution of the respective sample image. The intra-person similarity distribution indicates a similarity distribution between the respective sample image and a first-type image of a same person as the respective sample image, the inter-person similarity distribution indicates a similarity distribution between the respective sample image and a second-type image of a different person from the respective sample image. The method further includes providing the sample images and the similarity distribution distances of the sample images to a quality assessment model.

In an embodiment, a face image quality assessment apparatus includes processing circuitry configured to acquire sample images, the sample images including face image sets, each of the face image sets corresponding to a personal identity respectively. Each face image set includes at least two face images. The processing circuitry is further configured to determine a similarity distribution distance of each of the sample images based on the respective sample image and a personal identity corresponding to a face image set of the respective sample image. The similarity distribution distance of the respective sample image includes a distribution distance between an intra-person similarity distribution of the respective sample image and an inter-person similarity distribution of the respective sample image. The intra-person similarity distribution indicates a similarity distribution between the respective sample image and a first-type image of a same person as the respective sample image, the inter-person similarity distribution indicates a similarity distribution between the respective sample image and a second-type image of a different person from the respective sample image. The processing circuitry is further configured to provide the sample images and the similarity distribution distances of the sample images to a quality assessment model.

Details of one or more embodiments of this disclosure are provided in the accompanying drawings and descriptions below. Other features, objectives, and advantages of this disclosure are illustrated in the specification, the accompanying drawings, and the claims.

BRIEF DESCRIPTION OF THE DRAWINGS

To describe the technical solutions in the embodiments of this disclosure, the following briefly introduces the accompanying drawings describing the embodiments. The accompanying drawings in the following description show merely some embodiments of this disclosure, and a person of ordinary skill in the art may still derive other drawings from these accompanying drawings.

DESCRIPTION OF EMBODIMENTS

Figure 1:
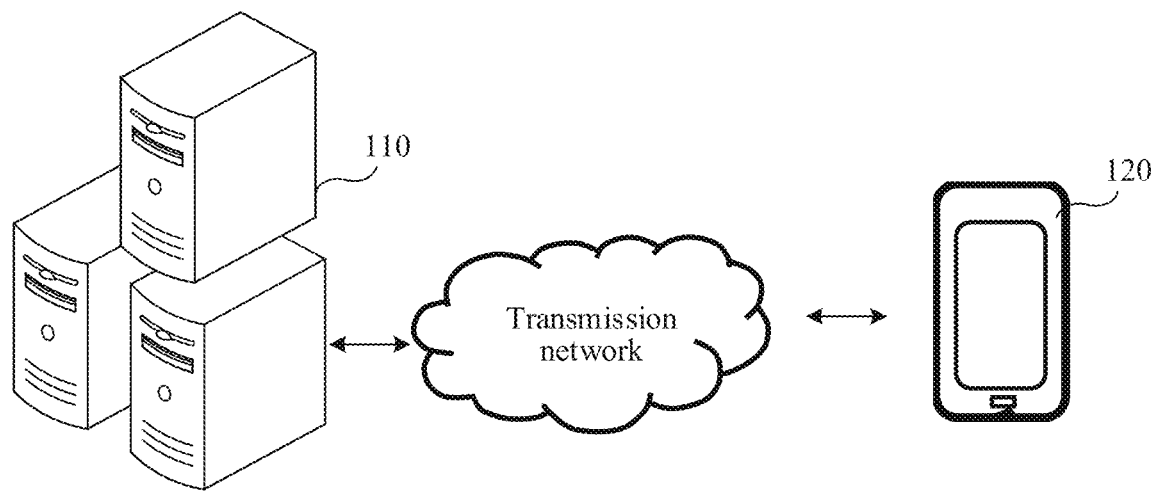
FIG. 1 is a structural diagram of a system for a face image quality assessment method according to an exemplary embodiment of this disclosure.

Exemplary embodiments are described in detail herein, and examples thereof are shown in the accompanying drawings. When the following descriptions are made with reference to the accompanying drawings, unless otherwise indicated, the same numbers in different accompanying drawings represent the same or similar elements. The following implementations described in the following exemplary embodiments do not represent all implementations that are consistent with this disclosure. Instead, they are merely examples of the apparatus and method according to some aspects of this disclosure as recited in the appended claims.

For convenience of understanding, terms in the embodiments of this disclosure are described.

1) Artificial Intelligence (AI)

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

The AI technology is a comprehensive subject, relating to a wide range of fields, and involving both hardware and software techniques. Basic AI technologies generally include technologies such as sensors, dedicated AI chips, cloud computing, distributed storage, big data processing technologies, operating/interaction systems, and mechatronics. An AI software technology mainly includes fields such as a CV technology, a speech processing technology, a natural language processing technology, and machine learning/deep learning (DL). A display device including an image collection component in this disclosure mainly involves computer vision, machine learning/deep learning, and other directions.

2) Computer Vision (CV)

The CV is a science that studies how to use a machine to "see", and furthermore, that uses a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. As a scientific discipline, the CV studies related theories and technologies and attempts to establish an AI system that can obtain information from images or multi-dimensional data. The CV technology generally includes technologies such as image processing, image recognition, image semantic understanding, image retrieval, optical character recognition (OCR), video processing, video semantic understanding, video content/behavior recognition, three-dimensional object reconstruction, a 3D technology, virtual reality (VR), augmented reality (AR), synchronous positioning, and map construction, and further include biological feature recognition technologies such as common face recognition and fingerprint recognition.

3) Face Recognition

Facial recognition is based on a biometric recognition technology of identification based on feature information of a human face.

Face recognition collects an image or video stream including a face by use of a video camera or a camera, automatically detects and tracks the face in the image, and further performs a series of related application operations on a detected face image, technically including image collection, feature localization, identity verification and search, etc.

(4) Unsupervised Learning

Unsupervised learning is a training method for machine learning, essentially a statistical method. It is a training manner by which some latent structures may be found from unlabeled data. Unsupervised learning mainly has the following characteristics. 1: There is no specific goal for unsupervised learning. 2: Unsupervised learning does not need data labeling. 3: Effects of unsupervised learning are unquantifiable.

Unsupervised learning mainly includes principal component analysis (PCA), Gaussian mixture model, manifold learning algorithm (Isomap), etc.

FIG. 1 is a structural diagram of a system for a face image quality assessment method according to an exemplary embodiment of this disclosure. As shown in FIG. 1, the system includes a server 110 and a terminal 120.

The server 110 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The terminal 120 may be, but not limited to, a smartphone, a tablet computer, a laptop computer, a desktop computer, a manual cash register, a self-service cash register, etc., which all have a face recognition function.

The system includes one or more servers 110 and multiple terminals 120. The numbers of the server 110 and the terminal 120 are not limited in this embodiment of this disclosure.

The terminal is connected to the server by a communication network. In an embodiment, the communication network is a wired network or a wireless network.

In an embodiment, a standard communication technology and/or protocol is used for the foregoing wireless network or the wired network. The network is usually the Internet, but may alternatively be any other networks, including but not limited to a local area network (LAN), a metropolitan area network (MAN), a wide area network (WAN), a mobile, wired, or wireless network, or any combination of a dedicated network or a virtual dedicated network). In some embodiments, technologies and/or formats such as the hypertext markup language (HTML) and the extensible markup language (XML) are used for representing data exchanged through the network. In addition, all or some links may be encrypted by using encryption technologies such as a secure socket layer (SSL), transport layer security (TLS), a virtual private network (VPN), and internet protocol security (IPsec). In other embodiments, custom and/or dedicated data communication technologies may also be used in place of or in addition to the foregoing data communication technologies. No limits are made in this disclosure.

Figure 2:
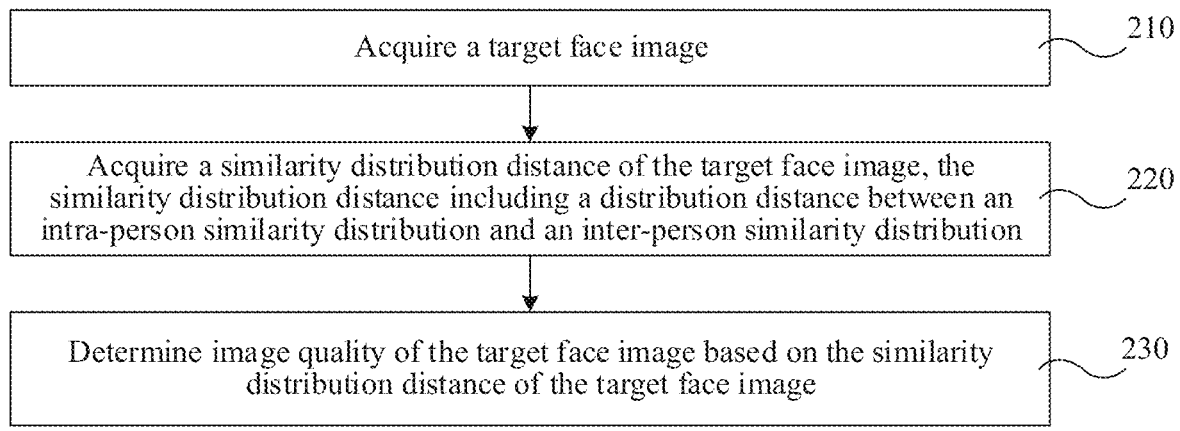
FIG. 2 is a flowchart of a face image quality assessment method according to an exemplary embodiment of this disclosure.

FIG. 2 is a flowchart of a face image quality assessment method according to an exemplary embodiment of this disclosure. The method is performed by a computer device. The computer device may be implemented as a terminal or server. The terminal or server may be the terminal or server shown in FIG. 1. As shown in FIG. 2, the face image quality assessment method includes the following steps.

In Step 210, a target face image is acquired.

In an embodiment, the target face image is a face image for face recognition.

Taking the method being performed by a server as an example, in an embodiment, a terminal collects a target face image through an image collector, and transmits the target face image to the server. Correspondingly, the server acquires the target face image transmitted by the terminal. The image collector may be a camera or a camera component.

In Step 220, a similarity distribution distance of the target face image is determined, the similarity distribution distance including a distribution distance between an intra-person similarity distribution corresponding to the target face image and an inter-person similarity distribution corresponding to the target face image, the intra-person similarity distribution being used for indicating a similarity distribution between the target face image and a first-type image, the first-type image being a face image corresponding to a same personal identity (i.e., the first-type image is an image of the same person) as the target face image, the inter-person similarity distribution being used for indicating a similarity distribution between the target face image and a second-type image, and the second-type image being a face image corresponding to a different personal identity (i.e., the second-type image is an image of a different person) from the target face image.

Schematically, the intra-person similarity distribution is used for indicating a similarity distribution between the target face image and a first-type image, and the first-type image is a face image corresponding to a same personal identity as the target face image, that is to say, the target face image and the first-type image are face images of the same person. The inter-person similarity distribution is used for indicating a similarity distribution between the target face image and a second-type image, and the second-type image is a face image corresponding to a different personal identity from the target face image, that is to say, the target face image and the second-type image are face images of different persons.

Figure 3:
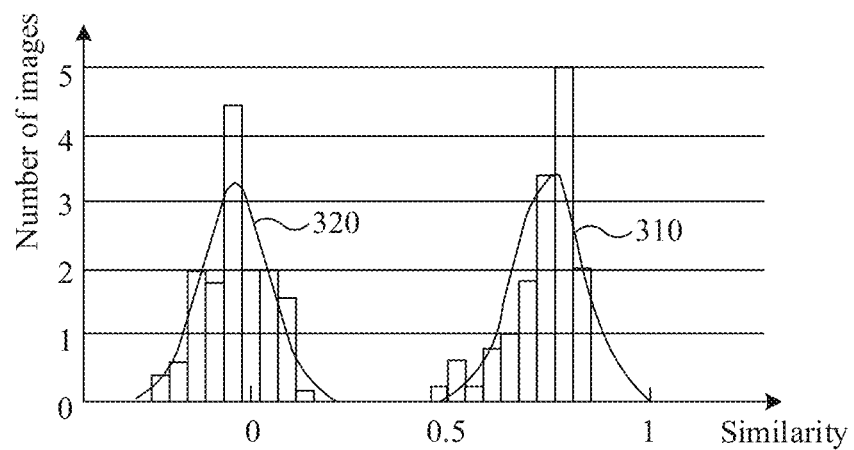
FIG. 3 is a schematic diagram of an intra-person similarity distribution and an inter-person similarity distribution according to an exemplary embodiment of this disclosure.

Since the first-type image is a face image corresponding to the same personal identity as the target face image, and the second-type image is a face image corresponding to a different personal identity from the target face image, the target face image, if having relatively high image quality, usually has a higher similarity with the first-type image but a lower similarity with the second-type image. FIG. 3 is a schematic diagram of an intra-person similarity distribution and an inter-person similarity distribution according to an exemplary embodiment of this disclosure. As shown in FIG. 3, on the premise of relatively high image quality of the target face image, the curve 310 represents the intra-person similarity curve corresponding to the target face image, and the curve 320 represents the inter-person similarity distribution corresponding to the target face image.

In an embodiment, the intra-person similarity distribution and inter-person similarity distribution corresponding to the target face image are acquired by unsupervised learning.

In Step 230, image quality of the target face image is determined based on the similarity distribution distance of the target face image.

In an embodiment, the image quality of the target face image is used for determining whether to perform face recognition on the target face image.

In an embodiment, if the image quality of the target face image is higher, an acquired intra-person similarity is higher, an inter-person similarity is lower, and a distance between the intra-person similarity distribution and the inter-person similarity distribution is greater. Therefore, the image quality of the target face image may be determined based on the similarity distribution distance of the target face image.

In summary, according to the face image quality assessment method provided in this embodiment of this disclosure, the image quality of the target face image is determined based on the distribution distance between the intra-person similarity distribution and inter-person similarity distribution corresponding to the target face image, so automatic acquisition of the image quality is implemented. In addition, the image quality is determined comprehensively from the two aspects of intra-person similarity and inter-person similarity, so the accuracy of acquiring the image quality for face recognition is improved.

In the solution described in this embodiment of this disclosure, the image quality of the target face image is acquired according to the distribution distance between the intra-person similarity distribution and inter-person similarity distribution of the target face image. Therefore, automatic acquisition of the image quality is implemented, and the accuracy of acquiring the image quality is improved. Application scenarios of the solution include, but not limited to, the following two.

1: Optimal Face Selection Scenario

An image with highest image quality may be selected by optimal face image selection from a trajectory or document as an identity representative for face recognition. As such, redundant information may be removed to reduce the bandwidth load, maximum utilization of information may be ensured, and information loss may be reduced. For example, when a suspect is tracked based on images in video data, the video data usually including multiple continuous face images of the suspect, the face image with highest image quality may be acquired from the multiple face images of the suspect for face recognition by the face image quality assessment method of this disclosure. As such, resource waste caused by face recognition on all images is avoided, while the accuracy of face recognition may be ensured.

2: Face Filtering Scenario

For example, a financial scenario, such as face recognition payment, has a high requirement for an index of a recognition algorithm, so it is often necessary to intercept images with low quality in advance while ensuring the security. In such case, image quality of a current face image needs to be acquired by the face image quality assessment method to determine whether the current image is suitable for face recognition based on an assessment result obtained by the face image quality assessment method, so as to avoid the risk of recognition failure or misrecognition in advance.

Figure 4:
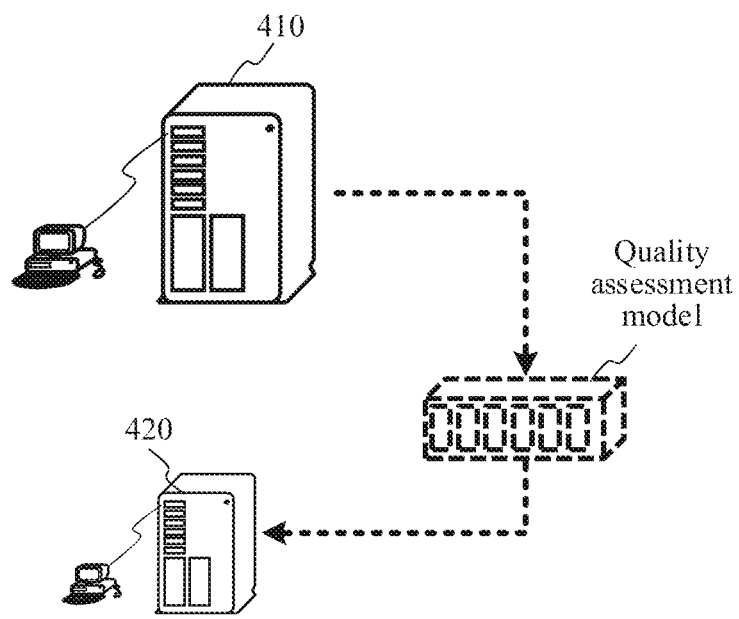
FIG. 4 is a framework diagram of quality assessment model training and face image quality assessment according to an exemplary embodiment.

The solution involved in this disclosure includes a quality assessment model training stage and a face image quality assessment stage. FIG. 4 is a framework diagram of quality assessment model training and face image quality assessment according to an exemplary embodiment. As shown in FIG. 4, in the quality assessment model training stage, a quality assessment model training device 410 obtains a quality assessment model based on a preset training sample (including a sample image and a pseudo-label of the sample image automatically generated based on the sample image, i.e., a similarity distribution distance of the sample image). In the face image quality assessment stage, a face image quality assessment device 420 performs quality assessment on an input target face image based on the quality assessment model to obtain image quality of the target face image.

The quality assessment model training device 410 and the face image quality assessment device 420 may be computer devices. For example, the computer device may be a fixed computer device such as a personal computer and a server, or a mobile computer device such as a tablet computer and an e-book reader.

In an embodiment, the quality assessment model training device 410 and the face image quality assessment device 420 may be the same device. Alternatively, the quality assessment model training device 410 and the face image quality assessment device 420 may be different devices. Moreover, when the quality assessment model training device 410 and the face image quality assessment device 420 are different devices, the quality assessment model training device 410 and the face image quality assessment device 420 are devices of the same type. For example, the quality assessment model training device 410 and the face image quality assessment device 420 may both be servers. Alternatively, the quality assessment model training device 410 and the face image quality assessment device 420 may be devices of different types. For example, the quality assessment model training device 410 may be a personal computer or terminal, and the face image quality assessment device 420 may be a server. Specific types of the quality assessment model training device 410 and the face image quality assessment device 420 are not limited in this embodiment of this disclosure.

Figure 5:
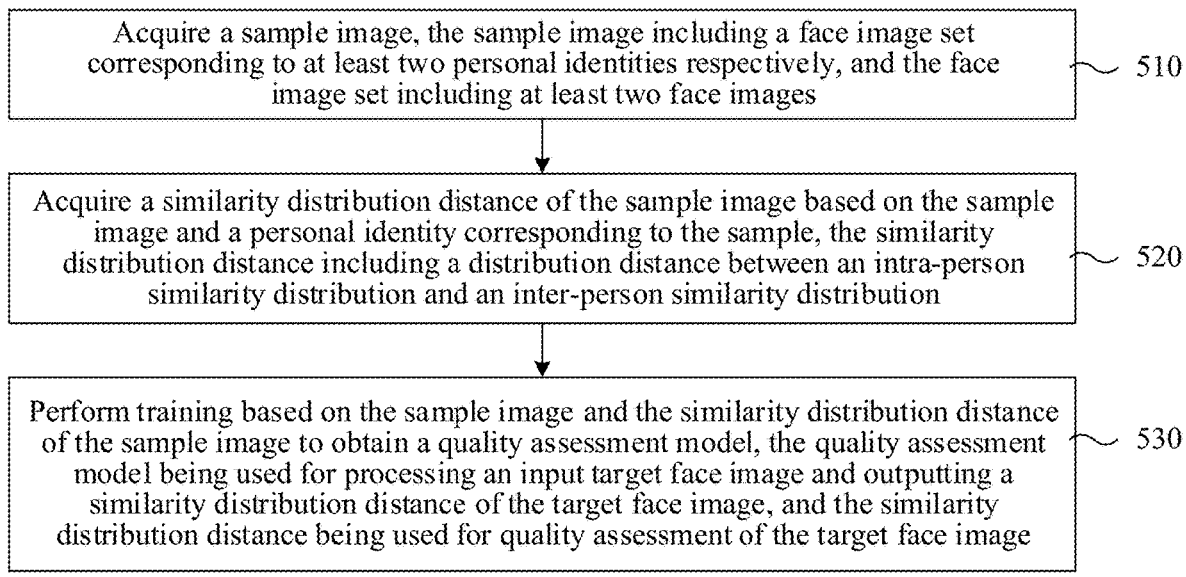
FIG. 5 is a flowchart of a quality assessment model training method according to an exemplary embodiment of this disclosure.

FIG. 5 is a flowchart of a quality assessment model training method according to an exemplary embodiment of this disclosure. The method may be performed by a computer device. The computer device may be implemented as a terminal or server. The terminal or server may be the terminal or server shown in FIG. 1. As shown in FIG. 5, the quality assessment model training method includes the following steps.

In Step 510, sample images are acquired, the sample images including face image sets, each of the face image sets corresponding to a personal identity respectively, and each face image set including at least two face images.

In Step 520, a similarity distribution distance of each sample image is determined based on the sample image and a personal identity corresponding to a face image set of the sample image, the similarity distribution distance of the sample image including a distribution distance between an intra-person similarity distribution corresponding to the sample image and an inter-person similarity distribution corresponding to the sample image, the intra-person similarity distribution corresponding to the sample image being used for indicating a similarity distribution between the sample image and a first-type image, the first-type image being a face image corresponding to the same personal identity as the sample image (i.e., the first-type image is an image of same person as the sample image), the inter-person similarity distribution being used for indicating a similarity distribution between the sample image and a second-type image, and the second-type image being a face image corresponding to a different personal identity from the sample image (i.e., the second-type image is an image of a different person from the sample image).

In Step 530, a quality assessment model to be trained is trained based on the sample images and the similarity distribution distance of the sample images to obtain a trained quality assessment model, the trained quality assessment model being used for processing an input target face image and outputting a similarity distribution distance of the target face image, and the similarity distribution distance of the target face image indicating quality assessment of the target face image.

In summary, according to the face image quality assessment method provided in this embodiment of this disclosure, the quality assessment model is trained based on the sample image and the similarity distribution distance of the sample image that is calculated based on the intra-person similarity distribution and inter-person similarity distribution corresponding to the sample image, so automatic acquisition of the similarity distribution distance of the sample image is implemented. Therefore, the image quality annotation cost is reduced, and the image quality annotation accuracy is improved.

Figure 6:
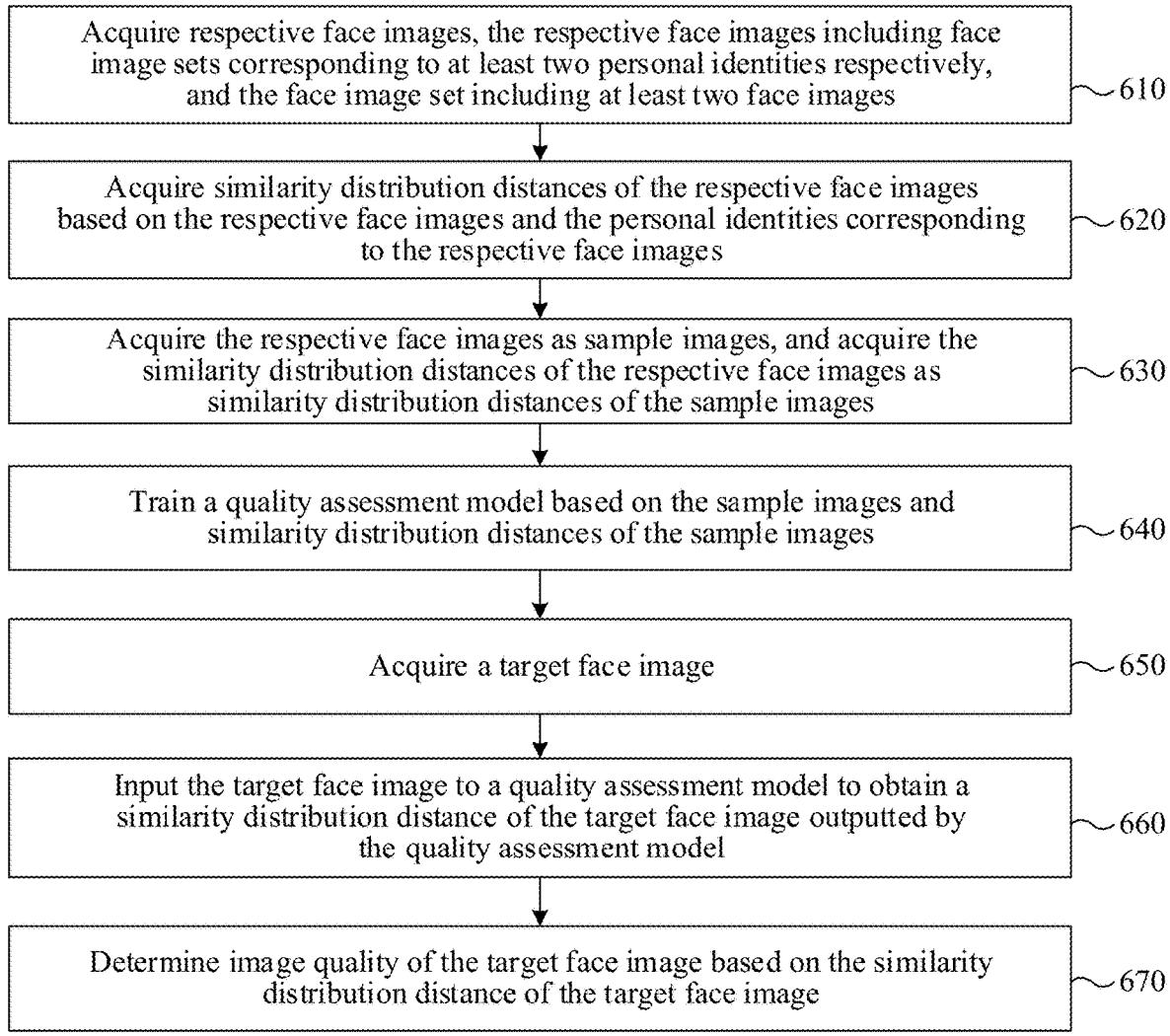
FIG. 6 is a flowchart of quality assessment model training and face image quality assessment methods according to an exemplary embodiment of this disclosure.

FIG. 6 is a flowchart of quality assessment model training and face image quality assessment methods according to an exemplary embodiment of this disclosure. The methods are performed by a computer device. The computer device may be implemented as a terminal or server. The terminal or server may be the terminal or server shown in FIG. 1. As shown in FIG. 6, the face image quality assessment method includes the following steps.

In Step 610, respective face images are acquired, the respective face images including face image sets corresponding to at least two personal identities respectively, and the face image set including at least two face images.

That is, the respective face images include face images corresponding to the same personal identity and face images corresponding to different personal identities. There are at least two face images corresponding to the same personal identities and at least two face images corresponding to different personal identities. The at least two face images respectively corresponding to persons of different personal identities are acquired as the respective face images. In an embodiment, each face image in a face image set corresponding to each person corresponds to an identity of this person for distinguishing from face images of another person.

In Step 620, similarity distribution distances of the respective face images are determined respectively based on the respective face images and the personal identities corresponding to the respective face images.

In an embodiment, the above step is implemented by the following operations: feature extraction is performed on the respective face images to obtain image features of the respective face images; a similarity between every two of the respective face images is determined based on the image features of the respective face images; and the similarity distribution distances of the respective face images are acquired based on the similarity between every two of the respective face images and the personal identities corresponding to the respective face images.

In an embodiment, the respective face images are processed through a feature extraction part in a face recognition model to obtain the image features of the respective face images.

In an embodiment, the image feature of the face image includes an apparent feature of the face image, including skin color, wrinkles, hair, eyes, nose, eyebrows, mouse, ears, and other facial features.

In an embodiment, the face image may include multiple faces. In such case, before feature extraction is performed on the respective face images by use of the face recognition model to obtain the image features of the respective face images, the method further includes the following operation: a valid face in the face image is acquired, the valid face referring to a face with a recognizable facial feature in the face image or a face that occupies a regional area reaching a preset threshold in the face image.

In an embodiment, the operation that the similarity distribution distances of the respective face images are acquired based on the similarity between every two of the respective face images and the personal identities corresponding to the respective face images include the following operations: a first similarity set between a first face image and a face image corresponding to a same personal identity in other images is acquired, the first face image being any one of the respective face images, the other images being the face images in the respective face images except the first face image, and the face image corresponding to the same personal identity being a face image corresponding to the same personal identity as the first face image in the other images; a second similarity set between the first face image and a face image corresponding to a different personal identity in the other images is acquired, the face image corresponding to the different personal identity being a face image corresponding to a different personal identity from the first face image in the other images; and a similarity distribution distance of the first face image is determined based on the first similarity set and the second similarity set.

Figure 7:
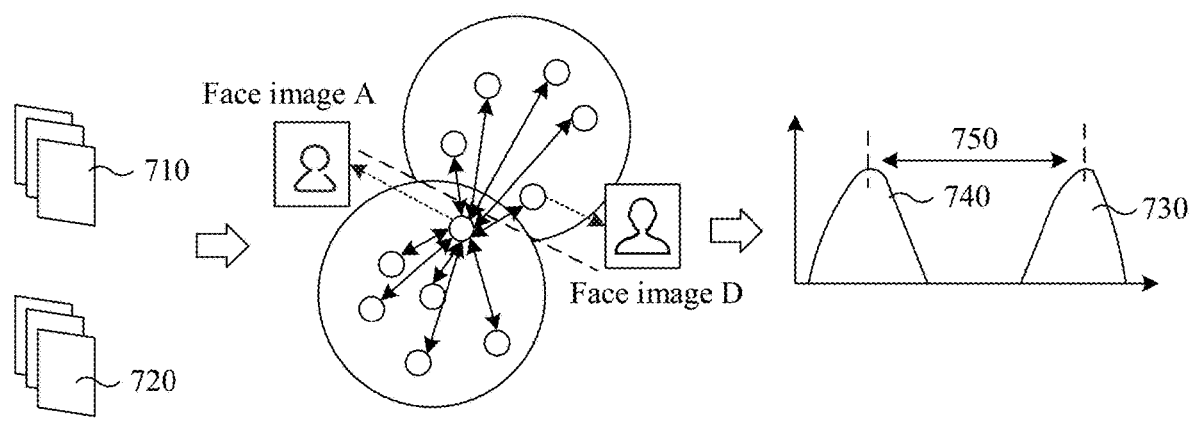
FIG. 7 is a schematic diagram of acquiring a similarity distribution distance of a face image according to an exemplary embodiment of this disclosure.

In an embodiment, the computer device calculates a similarity between every two acquired respective face images based on the acquired respective face images. $X=\{x_i\}_{i=1}^n$ and $\mathcal{F}\{f(x_i)\}_{i=1}^n$ represent a face image set and an embedded feature set corresponding to the quality assessment model respectively. Two samples $x_i$ and $x_j$ corresponding to the same personal identity form a positive pair (intra-class) corresponding to a label represented as $m_{ij}=+1$. In contrast, two samples corresponding to different personal identities form a negative pair (inter-class) corresponding to a label represented as $m_{ij}=-1$. Therefore, for each face image $x_i$, $S_{x_i}^P=\{s_{x_i}^P\langle f(x_i),f(x_j)\rangle m_{ij}=+1\}$ and $S_{x_i}^N=\{s_{x_i}^N\langle f(x_i),f(x_j)\rangle |m_{ij}=-1\}$ may be determined as similarity sets corresponding to positive pairs and negative pairs respectively. For example, the computer device acquires face image A, face image B, and face image C that correspond to a first personal identity, face image A, face image B, and face image C forming a first face image set, as well as face image D, face image E, and face image F that correspond to a second personal identity, face image D, face image E, and face image F forming a second face image set. The face images corresponding to the second personal identity may be face images corresponding to a different personal identity. In such case, face image B and face image C form positive pairs with face image A respectively, and face image D, face image E, and face image F form negative pairs with face image A respectively. Schematically, FIG. 7 is a schematic diagram of acquiring a similarity distribution distance of a face image according to an exemplary embodiment of this disclosure. As shown in FIG. 7, face image A, face image B, and face image C form a first face image set 710, and face image D, face image E, and face image F form a second face image set 720. Taking face image A being a target face image as an example, a similarity between face image A and each of face image B, face image C, face image D, face image E, and face image F is calculated. Then, a similarity distribution is acquired by statistics on the calculated similarities based on a personal identity corresponding to each face image. As shown in FIG. 7, a similarity distribution 730 represents similarity statistics on the face images corresponding to same identity information as face image A, and a similarity distribution 740 represents similarity statistics on the face images corresponding to different identity information from face image A. A similarity distribution distance between two corresponding points in the similarity distribution 730 and the similarity distribution 740 is acquired. In this embodiment of this disclosure, a distance 750 between peaks in the similarity distribution 730 and the similarity distribution 740 is acquired as the similarity distribution distance.

It is to be noted that the face image corresponding to the second personal identity refers to a face image corresponding to a different personal identity from the face image A. That is, the second personal identity may correspond to at least one person. In the above-mentioned embodiment, illustrations are made taking the second personal identity corresponding to one person as an example, and the number of persons corresponding to the second personal identity in this disclosure is not limited.

In an embodiment, the similarity distribution distance includes at least one of a maximum mean discrepancy (MMD), a minimum Euclidean distance (MED), a mean average distance (MAD), a medium distance (MID), and a Wasserstein distance (WD).

Figure 8:
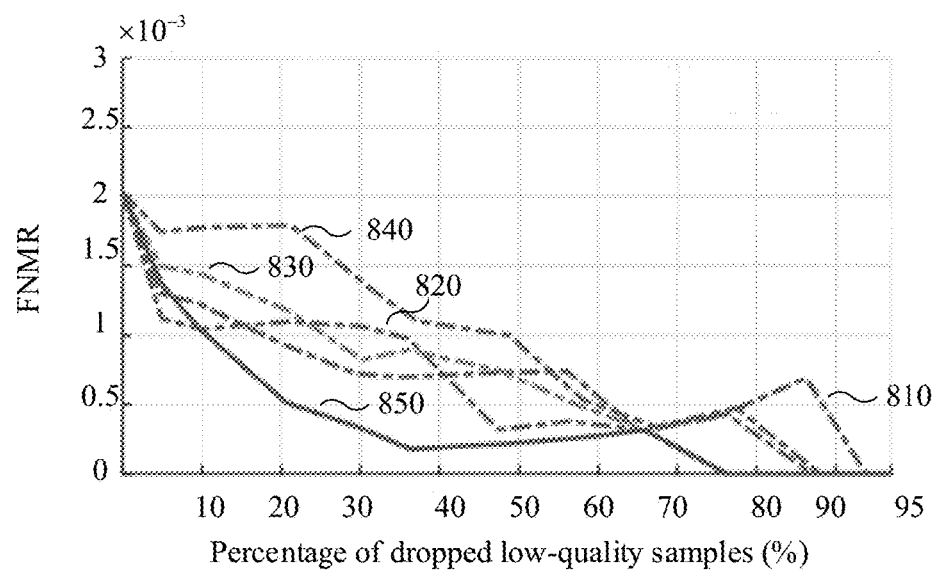
FIG. 8 is a schematic diagram of error versus reject curves of different distribution distances according to an exemplary embodiment of this disclosure.

Wasserstein distance is used in this embodiment of this disclosure. In this disclosure, friendliness of different distribution distances to face recognition is calculated. FIG. 8 is a schematic diagram of error versus reject curves (EVRCs) of different distribution distances according to an exemplary embodiment of this disclosure. The EVRC shows intra-person false no-match rates (RNMRs) calculated based on a fixed inter-person false match rate (FMR) when different percentages of low-quality samples are dropped. The faster the EVRC declines, the higher friendliness of this distribution distance to face recognition is.

As shown in FIG. 8, when a test set is ResNet101-MS1M (ResNet101 trained on MS1M), FMR=1e$^{-2}$, the curve 810 represents an EVRC corresponding to MMD, the curve 820 represents an EVRC corresponding to MED, the curve 830 represents an EVRC corresponding to MAD, the curve 840 represents an EVRC corresponding to MID, and the curve 850 represents an EVRC corresponding to WD. As shown in FIG. 8, the EVRC corresponding to WD is higher in decline rate and declines fastest. It indicates that, under the same inter-person false match rate, intra-person false no-match rates corresponding to WD when different percentages of low-quality samples are dropped are lower than those corresponding to the other distribution distances. Therefore, WD is more friendly to face recognition. In this disclosure, calculating the distribution distance between the intra-person similarity distribution and the inter-person similarity distribution based on WD may achieve a better calculation effect.

Calculating the distribution distance between the intra-person similarity distribution and the inter-person similarity distribution based on WD may be implemented as:

$$Q_{xi} = \mathrm{WD}(S_{xi}^P \| S_{xi}^N) = \inf_{\gamma \in \prod(S_{xi}^P, S_{xi}^N)} \mathbb{E}_{(s_{xi}^P, s_{xi}^N) \sim \gamma}[\| s_{xi}^P - s_{xi}^N \|]$$

where $S_{x_i}^P$ and $S_{x_i}^N$ represent an intra-person similarity set and inter-person similarity set of sample $x_i$ respectively, $\Pi(S_{x_i}^P, S_{x_i}^N)$ represents a joint probability density of $S_{x_i}^P$ and $S_{x_i}^N$, WD represents calculation of a distribution distance, $$\inf_{\gamma \in \prod(S_{xi}^P, S_{xi}^N)} \mathbb{E}_{(s_{xi}^P, s_{xi}^N) \sim \gamma}[\| s_{xi}^P - s_{xi}^N \|]$$

represents an expansion formula for calculation of the distribution distance, $\mathbb{E}$ represents a mean value function, and inf represents traversing all elements in two distributions.

In Step 630, the respective face images are determined as sample images, and the similarity distribution distances of the respective face images are determined as similarity distribution distances of the sample images.

That is, the respective face images are determined as sample images, and the similarity distribution distances of the respective face images are determined as similarity distribution distances of the sample images.

In Step 640, a quality assessment model is trained based on the sample images and similarity distribution distances of the sample images.

The above step is implemented by the following operations: the sample image is input to the quality assessment model to obtain a predicted distribution distance outputted by the quality assessment model to be trained; the similarity distribution distance and predicted distribution distance of the sample image are input to a loss function to obtain a loss function value; and parameter updating is updated on the quality assessment model based on the loss function value.

The quality assessment accuracy of the quality assessment model for a target face image may be ensured when an output result (i.e., the predicted distribution distance) of the quality assessment model obtained based on the sample image is similar to the similarity distribution distance of the sample image. Therefore, training may be performed for many times and update each parameter in the quality assessment model during the training of the quality assessment model until the quality assessment model converges.

In an embodiment, the loss function includes at least one of the following functions:

mean squared error (MSE), mean absolute error (MAE), and a regression loss function.

The regression loss function may be Huber loss (Huber loss function), represented as:

$$L_\zeta(x_i, \tilde{Q}_{x_i}; \pi) = \begin{cases} \frac{1}{2} \| \tilde{Q}_{x_i} - \phi_\pi(x_i) \|_2, & \text{if } |\tilde{Q}_{x_i} - \phi_\pi(x_i)| \leq \zeta \\ \zeta \| \tilde{Q}_{x_i} - \phi_\pi(x_i) \| - \frac{1}{2} \zeta^2, & \text{otherwise} \end{cases}$$

where $x_i$ represents an input image, i.e., a sample image, $\tilde{Q}_{x_i}$ represents a generated pseudo-label, $\phi_\pi(x_i)$ represents a similarity distribution distance predicted by the quality assessment model based on the input image, $\zeta$ and represents a position parameter experimentally set to 1.

In Step 650, a target face image is acquired.

In an embodiment, since a target face image acquired by the server is a face image collected in real time based on a camera of the terminal, under the impact of the environment where the person is, shaking of the camera of the terminal, the pixel of the camera of the terminal, etc., the face image may have different image quality. The image quality may be represented as a resolution of the face image, a proportion of a face region of the face image in the face image, a proportion of the face image that is occluded, etc.

In Step 660, the target face image is input to a trained quality assessment model to obtain a similarity distribution distance of the target face image outputted by the trained quality assessment model, the trained quality assessment model being obtained by training based on the sample images and the similarity distribution distances of the sample images.

In an embodiment, the trained quality assessment model is a quality assessment model obtained in advance by training based on the similarity distribution distances of the sample images. When the quality assessment model is used, the target face image is input to the trained quality assessment model to obtain a corresponding output result of the trained quality assessment model, i.e., a similarity distribution distance of the target face image.

In an embodiment, the trained quality assessment model may be deployed in the terminal, or the server.

In a possible implementation mode, the sample image and the similarity distribution distance of the sample image are acquired before the target face image is input to the quality assessment model to obtain the similarity distribution distance of the target face image outputted by the quality assessment model. The process of acquiring the sample image and the similarity distribution distance of the sample image is implemented as follows.

In Step 670, image quality of the target face image is determined based on the similarity distribution distance of the target face image.

Figure 9:
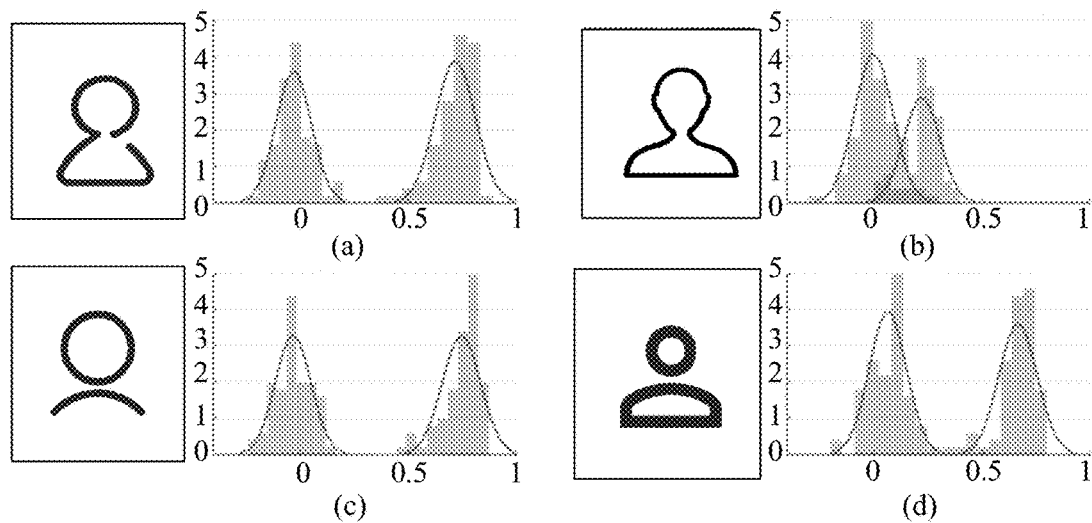
FIG. 9 is a schematic diagram of intra-person similarities and inter-person similarities corresponding to face images with different image quality according to an exemplary embodiment of this disclosure.

In an embodiment, based on different image quality of face images, there may be four cases for intra-person similarity and inter-person similarity: (1) the intra-person similarity is high, and the inter-person similarity is high; (2) the intra-person similarity is low, and the inter-person similarity is low; (3) the intra-person similarity is high, and the inter-person similarity is low; and (4) the intra-person similarity is low, and the inter-person similarity is high. Generally speaking, if image quality of a face image is higher, an intra-person similarity calculated according to the face image is higher, while an inter-person similarity is lower. FIG. 9 is a schematic diagram of intra-person similarities and inter-person similarities corresponding to face images with different image quality according to an exemplary embodiment of this disclosure. Part (a) in FIG. 9 corresponds to case (1). Part (b) in FIG. 9 corresponds to case (2). Part (c) in FIG. 9 corresponds to case (3). Part (d) in FIG. 9 corresponds to case (4). As shown in FIG. 9, in the four cases, image quality corresponding to case (3) is highest, and thus a distribution distance between an intra-person similarity and an inter-person similarity distribution is maximum. Image quality corresponding to case (2) is lowest, and thus a distribution distance between an intra-person similarity distribution and an inter-person similarity distribution is minimum. Image quality corresponding to case (1) and (4) is between case (2) and case (3). Therefore, image quality of a face image may be determined according to a distribution distance between an intra-person similarity distribution and an inter-person similarity distribution.

In an embodiment, in order to determine image quality of a face image, an image quality threshold is preset in the computer device. The target face image is input, in a case that the image quality of the target face image is greater than the preset image quality threshold, to a face recognition model to obtain a personal identity corresponding to the target face image.

In an embodiment, in a case that the image quality of the target face image is less than the preset image quality threshold, prompting information is fed back to a user based on a display interface of the terminal. The prompting information may include information for prompting the user to adjust the position, or how to adjust the position, or that face recognition fails, etc.

In summary, according to the face image quality assessment method provided in this embodiment of this disclosure, the quality assessment model to be trained is trained based on the similarity distribution distance of the sample image that is calculated based on the intra-person similarity distribution and inter-person similarity distribution corresponding to the sample image, and the image quality of the target face image is determined by use of the trained quality assessment model, so automatic acquisition of the image quality is implemented. In addition, the image quality is determined comprehensively from the two aspects of intra-person similarity and inter-person similarity, so the accuracy of acquiring the image quality is improved.

In addition, the similarity distribution distance of the sample image is acquired automatically during the training of the quality assessment model, so the image quality annotation cost is reduced, and the image quality annotation accuracy is improved.

A formula derivation process of calculating the distribution distance between the intra-person similarity distribution and the inter-person similarity distribution based on WD is schematically introduced.

It is assumed that $S_X^P$ and $S_X^N$ represent similarity sets corresponding to positive pairs and negative pairs respectively, $S_{X|<\varepsilon}^P$ represents a subset of $S_X^P$ whose similarity is less than a threshold $\varepsilon$, and $S_{X|\varepsilon}^N$ and represents a subset of $S_X^N$ whose similarity is greater than $\varepsilon$. In such case, the FMR and the FNMR may be respectively defined as:

$$R_{fm}(X, \varepsilon) = \frac{|S_{X|>\varepsilon}^N|}{|S_X^N|} \quad (1)$$

$$R_{fnm}(X, \varepsilon) = \frac{|S_{X|<\varepsilon}^P|}{|S_X^P|}, \quad (2)$$

where |•| represents a set cardinal number. It is assumed that $X_{|>\sigma}$ represents that a subset of X does not include $\sigma(\%)$ of face images with lowest quality, where represents that a ratio of unconsidered images (UIR). The EVRC shows a relationship between the UIR($\sigma$) and $R_{fm}(X_{|>\sigma}, \varepsilon_{|>\sigma})$ under a fixed $R_{fm}(X_{|>\sigma}, \varepsilon_{|>\sigma})$. In the above process, in order to obtain a fixed FMR, the threshold $\varepsilon_{|>\sigma}$ needs to change with $X_{|>\sigma}$. According to the indexes of the EVRC, the EVRC of the recognition system may decline rapidly if a sample image set with a standard quality label is used for testing. In other words, if the FNMR declines faster when a sample $x_i$ deleted from the sample image set, the quality of the sample $x_i$ is lower. Therefore, under a fixed FMR, a difference between FNMRs when there is the sample $x_i$ and is no sample $x_i$ may be acquired as a quality score (represented as $q_{x_i}$) of the sample $x_i$:

$$q_{x_i} = R_{fnm}(x, \varepsilon_0) - R_{fnm}(X_{|-x}^i, \varepsilon_{|-x_i}) \quad (3)$$

where $X_{|-x_i}$ represents a subset of X not including $x_i$, and $\varepsilon_0$ and $\varepsilon_{|-x_i}$ represent thresholds of X and $X_{|-x_i}$ respectively.

Objectively speaking, the standard quality label of $x_i$ represents a real quality score thereof and is unrelated to the FMR. However, it can be seen from formula (3) that one empirical quality score may be obtained under a fixed FMR. In practice, it can be seen from formula (1) that, for a specific $S_X^N$, different FMRs may be obtained in case of different thresholds. Further, it can be seen from formula (2) that the FNMR is determined according to the threshold of the specific $S_X^P$, so the threshold $\varepsilon$ may be changed to obtain a plenty of empirical quality scores of the sample image. Therefore, the following conclusions may be reached.

(1) When the FMR changes from 0 to 1, the threshold $\varepsilon$ changes from 1 to −1.

(2) For all samples $\{x_i\}_{i=1}^n$, although $\varepsilon_0$ is not equal to $\varepsilon_{|-x_i}$, they are very likely to be equal, or approximately equal in the above cases.

(3) In the indexes of the EVRC, when the FMR is fixed, the threshold $\varepsilon$ is fixed, and then the FNMR may be determined according to the threshold $\varepsilon$.

Based on the above conclusions, the following hypotheses may be made: (1)

$$R_{fm} = \frac{1}{2}(1 - \varepsilon);$$

and (2) for all fixed FMRs, $\varepsilon_{|-x_i} = \varepsilon_0 = \varepsilon$. Therefore, formula (3) may be simplified to:

$$q_{x_i} = R_{fnm}(x, \epsilon) - R_{fnm}(X_{1-x_i}, \epsilon) \quad (4).$$

Theoretically, an expected value of $q_{z_i}$ under the FMR may be acquired as a standard quality score of the sample $x_i$. Then, the following formula may be obtained:

$$Q_{x_i} = \frac{1}{2}\int_{-1}^{1}[R_{fnm}(X, \epsilon) - R_{fnm}(X_{-x_i}, \epsilon)]d\epsilon = \quad (5)$$

$$\int_0^1 [R_{fnm}(X, (1-2R_{fm})) - R_{fnm}(X_{1-x_i}, (1-2R_{fm}))]dR_{fm}.$$

Based on formula (2) to formula (5), the following formula may be obtained:

$$Q_{x_i} = \int_0^1 \left[\frac{|S_X^P|_{<(1-2R_{fm})}|}{|S_X^P|} - \frac{|S_{X_{1-x_i}}^P|_{<(1-2R_{fm})}|}{|S_{X_{1-x_i}}^P|}\right]dR_{fm}. \quad (6)$$

$S_{X1-x_i}^P = S_X^P - S_{x_i}^P$ and $S_{X1-x_i}^N = S_X^N - S_{x_i}^N$ are defined: for a specific data set X, $S_X^P$ and $S_X^N$ are both unrelated to the sample $x_i$. Therefore, formula (6) may be simplified to:

$$Q_{x_i} = F(S_{x_i}^P, S_{x_i}^N) \quad (7)$$

where $F(\cdot)$ represents a mapping function from $S_{x_i}^P$ and $S_{x_i}^N$ to $Q_{x_i}$. FIG. 9 may accurately show the content of formula (7). For a high-quality face image, a distribution distance between a positive pair similarity distribution (intra-person similarity distribution) and a negative pair similarity distribution (inter-person similarity distribution) is relatively large, such as part (c) in FIG. 9. In contrast, for a low-quality face image, a distribution distance between a positive pair similarity distribution (intra-person similarity distribution) and a negative pair similarity distribution (inter-person similarity distribution) is relatively small, such as part (b) in FIG. 9. In addition, for a face image with relatively high quality, a positive pair similarity distribution (intra-person similarity distribution) and a negative pair similarity distribution (inter-person similarity distribution) do not overlap, such as part (a) and part (c) in FIG. 9.

Based on the above analysis, the similarity distribution distance (SDD) may be modeled as the real quality score, represented as:

$$Q_{xi} = \mathbb{WD}(S_{xi}^P \| S_{xi}^N) = \inf_{\gamma \in \Gamma(S_{xi}^P, S_{xi}^N)} \mathbb{E}_{(s_{xi}^P, s_{xi}^N) \sim \gamma}[\|S_{xi}^P - S_{xi}^N\|]. \quad (8)$$

According to the international biometric feature quality standard ISO/IEC 29794-1:2016 (ISO/IEC 2016), the face quality score is within [0, 100], where 100 and 0 represent highest and lowest quality scores. Therefore, the quality score of the sample $x_i$ is:

$$Q_{x_i} = \delta[\mathbb{WD}(S_{x_i}^P \| S_{x_i}^N)], \quad (9)$$

$$\text{where } \delta[l_{x_i}] = 100 \times \frac{l_{x_i} - \min(\mathcal{L})}{\max(\mathcal{L}) - \min(\mathcal{L})}, l_{x_i} \in \mathcal{L}, \text{ and}$$

$$\mathcal{L} = \{l_{x_1}, l_{x_2}, \dots, l_{x_n}\}.$$

In an embodiment, for a face image set whose size is n, if pair similarities are included in an overall data set, the number of positive and negative pairs of each sample is n. In such case, the time complexity of the SDD is $\mathcal{O}(n^2)$. If the face image set is too large, the calculation amount is large. In order to reduce the calculation complexity, m pairs may be randomly selected, where m is set to an even number, and m<<n. Therefore, m/2 positive pairs and m/2 negative pairs may be obtained. Then, calculation is performed for K times based on $Q_{x_i}$ to transform formula (9) to:

$$\hat{Q}_{x_i} = \frac{\sum_{k=1}^{K} \delta[\mathbb{WD}(S_{x_i^k}^P \| S_{x_i^k}^N)]}{K}, \quad (10)$$

where $S_{x_i^k}^P$ and $S_{x_i^k}^N$ represent similarities obtained by sampling the positive pairs and negative pairs in the m pairs respectively. The time complexity in formula (9) is recorded as $\mathcal{O}(n)$. For each sample image, m and K are set as constants. The calculation complexity of formula (10) is $\mathcal{O}(m \times K) = \mathcal{O}(1)$. Therefore, the time complexity of generating the similarity distribution distance based on the quality assessment model reaches $\mathcal{O}(n)$.

Assuming that $\epsilon[\mathbb{WD}(S_{x_i^k}^P \| S_{x_i^k}^N)]$ is an noiseless estimation of $Q_{x_i}$, and a noise variable k is introduced to each sample, formula (10) may be rewritten as:

$$\hat{Q}_{x_i} = \frac{\sum_{k=1}^{K}(\delta[\mathbb{WD}(S_{x_i}^P \| S_{x_i}^N)] + \epsilon_k)}{K}$$

where $\epsilon_k$ can be understood as a difference between $\epsilon[\mathbb{WD}(S_{x_i^k}^P \| S_{x_i^k}^N)]$ and $\epsilon[\mathbb{WD}(S_{x_i}^P \| S_{x_i}^N)]$. The m pairs used in formula (10) are acquired by random and independent sampling from all of the n pairs. According to a probability theory (Papoulis and Pillai 2002), $$\lim_{k \to \infty} \sum_{i=1}^{K} \epsilon_i = 0$$

may be obtained. Therefore, formula (10) is an unbiased estimation of formula (9).

Figure 10:
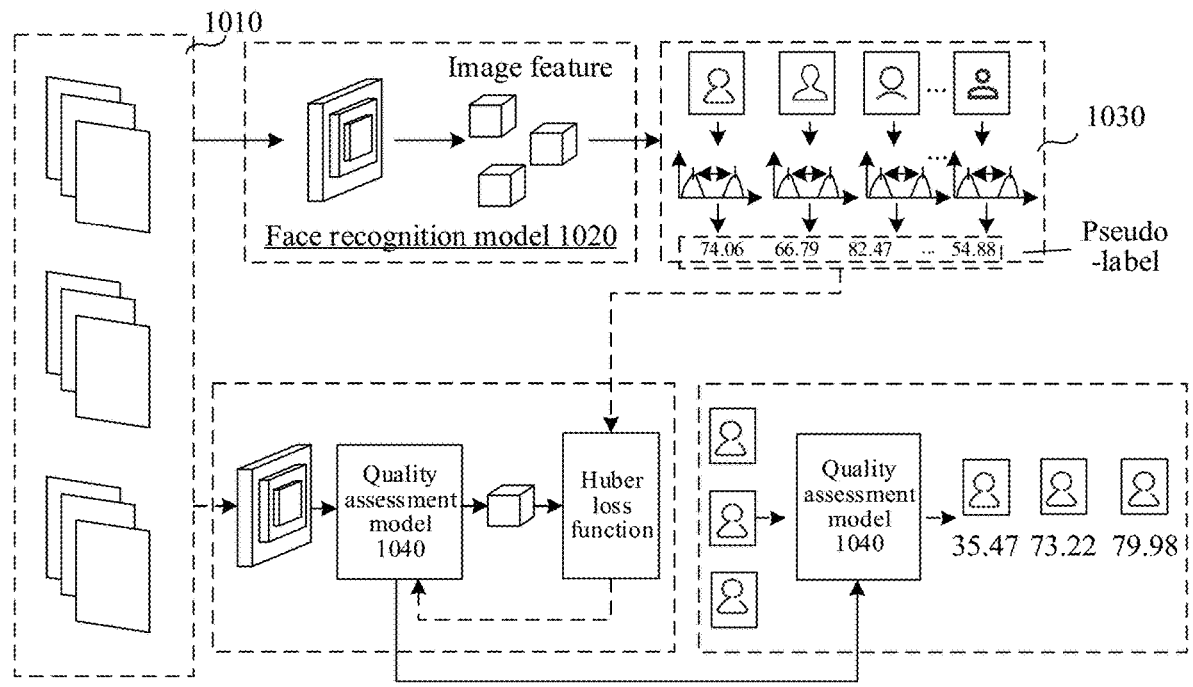
FIG. 10 is a framework diagram of a similarity distribution distance-face image quality assessment method according to an exemplary embodiment of this disclosure.

The face image quality assessment method described in this disclosure includes two parts: quality pseudo-label generation and quality training. Therefore, the face image quality assessment method may be referred to as a similarity distribution distance-face image quality assessment (SDD-FIQA) method. FIG. 10 is a framework diagram of an SDD-FIQA method according to an exemplary embodiment of this disclosure. As shown in FIG. 10, when a quality assessment model is trained, face images 1010 corresponding to different personal identities are input to a face recognition model 1020 first, each personal identity corresponding to at least two face images. The face recognition model 1020 performs image feature extraction on the respective face images through its feature extraction part to obtain image features of the respective face images. The face recognition model 1020 imports the extracted image features of the respective face images to a pseudo-label generation module 1030. The pseudo-label generation module 1030 calculates a similarity between every two of the respective face images, and obtains intra-person similarity distributions and inter-person similarity distributions corresponding to the respective face images based on identity information corresponding to the respective face images, and acquires Wasserstein distances between the intra-person similarity distributions and inter-person similarity distributions corresponding to the respective face images as pseudo-labels (i.e., similarity distances) corresponding to the respective face images 1010 respectively. In addition, the face images 1010 corresponding to different personal identities are input to a quality assessment model 1040 that may be implemented as a regression network model, to obtain a similarity distance prediction results obtained by the quality assessment model 1040 based on the face images 1010 corresponding to different personal identities. The similarity distance prediction results of the respective face images 1010 and the pseudo-labels respectively corresponding to the respective face images 1010 are input to Huber loss (Huber loss function) to calculate loss function values, and parameter updating is performed on the quality assessment model based on the loss function values.

FIG. 10 also shows a framework diagram of the quality assessment model in application. As shown in FIG. 10, in application of the quality assessment model, a target face image that needs quality assessment is input to the quality assessment model 1040 to obtain a corresponding quality assessment result. The quality assessment result is represented as a score of the target face image, i.e., a distance between an intra-person similarity distribution and inter-person similarity distribution corresponding to the target face image.

Figure 11:
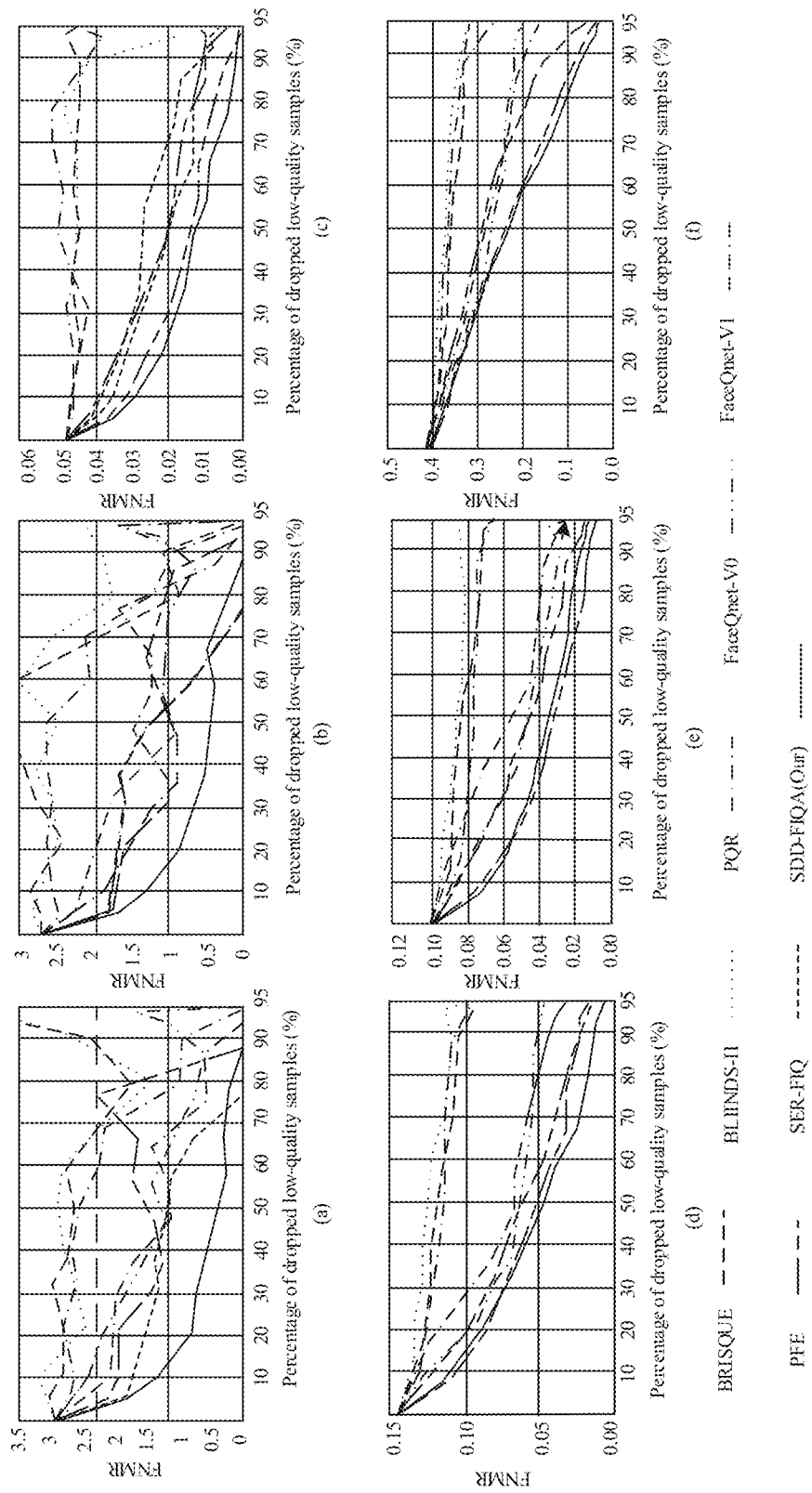
FIG. 11 is a schematic diagram of error versus reject curves of quality assessment models obtained by training based on different training methods according to an exemplary embodiment of this disclosure.

In an embodiment, in order to verify the accuracy of the trained quality assessment model obtained by training based on the SDD-FIQA method provided in this disclosure, the trained quality assessment model obtained by training based on the SDD-FIQA method provided in this disclosure is compared with a quality assessment model obtained by training based on a method in the related art. FIG. 11 is a schematic diagram of EVRCs of quality assessment models obtained by training based on different training methods according to an exemplary embodiment of this disclosure. As shown in FIG. 11, comparison is performed in two aspects of labeled faces in the wild (LFW) (face comparison data set) and Adience (face data set). It can be seen from FIG. 11 that the performance of the trained quality assessment model obtained by training based on the SDD-FIQA method under different FMRs and different test sets is superior to that of the other methods in the related art.

In the EVRC diagram, when two curves are very close, it is difficult to determine the better. Therefore, to quantify the comparison results of the quality assessment model obtained by training based on the SDD-FIQA method and the quality assessment model obtained by training based on the method in the related art, an area calculation coefficient (ACC) is introduced in this disclosure to quantify the EVRC result. Schematically, the ACC is calculated through the following formula:

$$ACC = 1 - \int_a^b f(\sigma) d\sigma$$

where $f(\sigma)$ represents the FNMR at $\sigma$, and a and b represent an upper limit and lower limit of the UIR respectively. In this embodiment of this disclosure, the upper limit and lower limit of the UIR are set to 0 and 0.95 respectively.

Based on the above formulas, the curves shown in FIG. 11 is converted into integral values between coordinate axes to obtain forms shown in Table 1, Table 2, and Table 3. As shown in Table 1, Table 2, and Table 3, numerical comparison may reflect more directly the accuracy of the quality assessment model obtained by training based on the SDD-FIQA method provided in this disclosure compared with the quality assessment model obtained by training based on the method in the related art.

Table 1 corresponds to FIGS. (a) and (d) in FIG. 11, and is used to represent assessment results obtained by the quality assessment model obtained by training based on different training methods under the test set ResNet50-MS1M(ResNet50 trained on MS1M). Table 2 corresponds to FIGS. (b) and (e) in FIG. 11, and is used to represent assessment results obtained by the quality assessment model obtained by training based on different training methods under the test set ResNet101-MS1M(ResNet101 trained on MS1M). Table 3 corresponds to FIGS. (c) and (f) in FIG. 11, and is used to represent assessment results obtained by the quality assessment model obtained by training based on different training methods under the test set ResNet101-CASIA(ResNet101 trained on CASIA).

TABLE 1

| LFW | FMR = $1e^{-2}$ | FMR = $1e^{-3}$ | FMR = $1e^{-4}$ | Avg |
|---|---|---|---|---|
| BRISQUE (2012) | 0.0321 | 0.0953 | 0.2579 | 0.1284 |
| BLIINDS-II (2012) | 0.1755 | 0.0923 | 0.2270 | 0.1649 |
| PQR (2018) | 0.1921 | 0.2952 | 0.3519 | 0.2797 |
| FaceQnet-V0 (2019) | 0.4535 | 0.4955 | 0.5399 | 0.4963 |
| FaceQnet-V1 (2020) | 0.4417 | 0.5471 | 0.6167 | 0.5352 |
| PFE (2019) | 0.4814 | 0.5057 | 0.5895 | 0.5255 |
| SER-FIQ (2020) | 0.5669 | 0.6675 | 0.7469 | 0.6604 |
| SDD-FIQA(Our) | 0.8284 | 0.7993 | 0.8170 | 0.8149 |

| Adience | FMR = $1e^{-2}$ | FMR = $1e^{-3}$ | FMR = $1e^{-4}$ | Avg |
|---|---|---|---|---|
| BRISQUE (2012) | 0.2686 | 0.2056 | 0.2353 | 0.2365 |
| BLIINDS-II (2012) | 0.1723 | 0.1634 | 0.1565 | 0.1640 |
| PQR (2018) | 0.2454 | 0.2102 | 0.1962 | 0.2173 |
| FaceQnet-V0 (2019) | 0.4756 | 0.5021 | 0.4735 | 0.4837 |
| FaceQnet-V1 (2020) | 0.3809 | 0.4613 | 0.4350 | 0.4257 |
| PFE (2019) | 0.5490 | 0.6046 | 0.5556 | 0.5698 |
| SER-FIQ (2020) | 0.5009 | 0.5539 | 0.4384 | 0.4977 |
| SDD-FIQA(Our) | 0.5962 | 0.6307 | 0.5719 | 0.5996 |

TABLE 2

| LFW | FMR = $1e^{-2}$ | FMR = $1e^{-3}$ | FMR = $1e^{-4}$ | Avg |
|---|---|---|---|---|
| BRISQUE (2012) | 0.0700 | 0.1200 | 0.1779 | 0.1227 |
| BLIINDS-II (2012) | 0.2035 | 0.2004 | 0.2056 | 0.2032 |
| PQR (2018) | 0.3508 | 0.2657 | 0.2995 | 0.3053 |
| FaceQnet-V0 (2019) | 0.5277 | 0.5757 | 0.5707 | 0.5580 |
| FaceQnet-V1 (2020) | 0.5002 | 0.5158 | 0.5901 | 0.5354 |
| PFE (2019) | 0.5402 | 0.5587 | 0.5828 | 0.5606 |
| SER-FIQ (2020) | 0.6027 | 0.6401 | 0.7011 | 0.6480 |
| SDD-FIQA(Our) | 0.8181 | 0.7881 | 0.7874 | 0.7979 |

| Adience | FMR = $1e^{-2}$ | FMR = $1e^{-3}$ | FMR = $1e^{-4}$ | Avg |
|---|---|---|---|---|
| BRISQUE (2012) | 0.2773 | 0.2097 | 0.2412 | 0.2428 |
| BLIINDS-II (2012) | 0.1425 | 0.1416 | 0.2660 | 0.1834 |
| PQR (2018) | 0.2697 | 0.2322 | 0.2601 | 0.2540 |
| FaceQnet-V0 (2019) | 0.4380 | 0.4874 | 0.4837 | 0.4697 |
| FaceQnet-V1 (2020) | 0.3475 | 0.4196 | 0.4721 | 0.4131 |
| PFE (2019) | 0.5130 | 0.6168 | 0.5909 | 0.5736 |
| SER-FIQ (2020) | 0.4763 | 0.5163 | 0.4768 | 0.4898 |
| SDD-FIQA(Our) | 0.5563 | 0.6415 | 0.6365 | 0.6114 |

TABLE 3

| LFW | FMR = $1e^{-2}$ | FMR = $1e^{-3}$ | FMR = $1e^{-4}$ | Avg |
|---|---|---|---|---|
| BRISQUE (2012) | 0.0689 | 0.0976 | 0.1870 | 0.1178 |
| BLIINDS-II (2012) | -0.0065 | 0.0557 | 0.2277 | 0.0923 |
| PQR (2018) | 0.1771 | 0.0213 | 0.0849 | 0.0944 |
| FaceQnet-V0 (2019) | 0.5454 | 0.4635 | 0.4649 | 0.4913 |
| FaceQnet-V1 (2020) | 0.5938 | 0.5174 | 0.4842 | 0.5318 |
| PFE (2019) | 0.6381 | 0.6500 | 0.6090 | 0.6324 |
| SER-FIQ (2020) | 0.6212 | 0.5413 | 0.4962 | 0.5529 |

TABLE 3-continued

| | | | | |
|---|---|---|---|---|
| SDD-FIQA(Our) | 0.7395 | 0.7001 | 0.6296 | 0.6898 |
| Adience | FMR = $1e^{-2}$ | FMR = $1e^{-3}$ | FMR = $1e^{-4}$ | Avg |
| BRISQUE (2012) | 0.1551 | 0.1398 | 0.1489 | 0.1479 |
| BLIINDS-II (2012) | 0.1163 | 0.1037 | 0.1337 | 0.1179 |
| PQR (2018) | 0.1559 | 0.1327 | 0.1140 | 0.1342 |
| FaceQnet-V0 (2019) | 0.4244 | 0.3271 | 0.2840 | 0.3452 |
| FaceQnet-V1 (2020) | 0.4283 | 0.3136 | 0.2524 | 0.3314 |
| PFE (2019) | 0.5730 | 0.4392 | 0.3154 | 0.4425 |
| SER-FIQ (2020) | 0.4529 | 0.3327 | 0.2826 | 0.3561 |
| SDD-FIQA(Our) | 0.5790 | 0.4535 | 0.3443 | 0.4589 |

Figure 12:
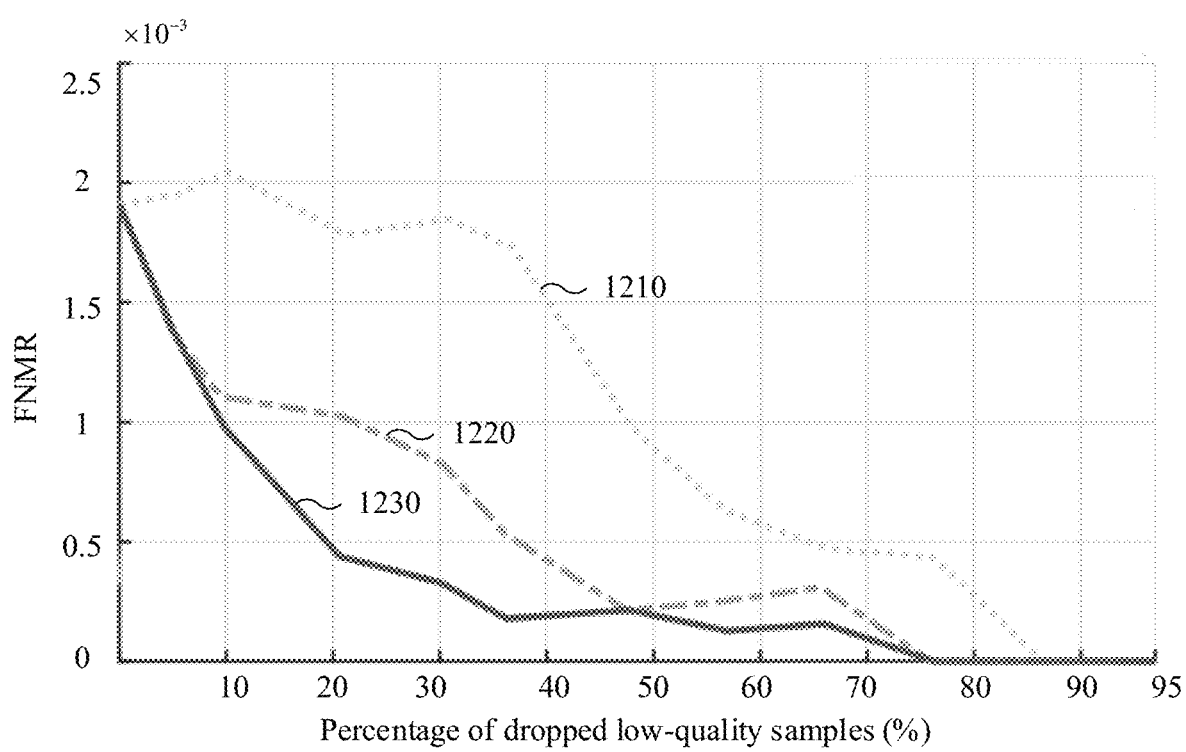
FIG. 12 is a schematic diagram of error versus reject curves of quality assessment models obtained by training based on different distribution conditions according to an exemplary embodiment of this disclosure.

In addition, in order to verify the accuracy of the quality assessment model obtained by training based on the SDD-FIQA method provided in this disclosure, the quality assessment model obtained by training based on the SDD-FIQA method provided in this disclosure is compared with a quality assessment model obtained by training considering the unilateral distribution. Considering the unilateral distribution includes considering the intra-person distribution and considering the inter-person distribution. FIG. 12 is a schematic diagram of EVRCs of quality assessment models obtained by training based on different distribution conditions according to an exemplary embodiment of this disclosure. As shown in FIG. 12, in case of test set ResNet50-MS1M and FMR=$1e^{-2}$, the curve 1210 corresponds to an EVRC of the quality assessment model obtained considering the inter-person distribution, the curve 1220 corresponds to an EVRC of the quality assessment model obtained considering the intra-person distribution, and the curve 1230 corresponds to an EVRC of the quality assessment model obtained considering both the intra-person distribution and the inter-person distribution in this disclosure. Comparison of the three curves shows that the effect of the quality assessment model obtained by training considering the unilateral distribution is far poorer than that of the quality assessment model obtained considering both the intra-person distribution and the inter-person distribution. Therefore, the method provided in this disclosure is proved proper.

Figure 13:
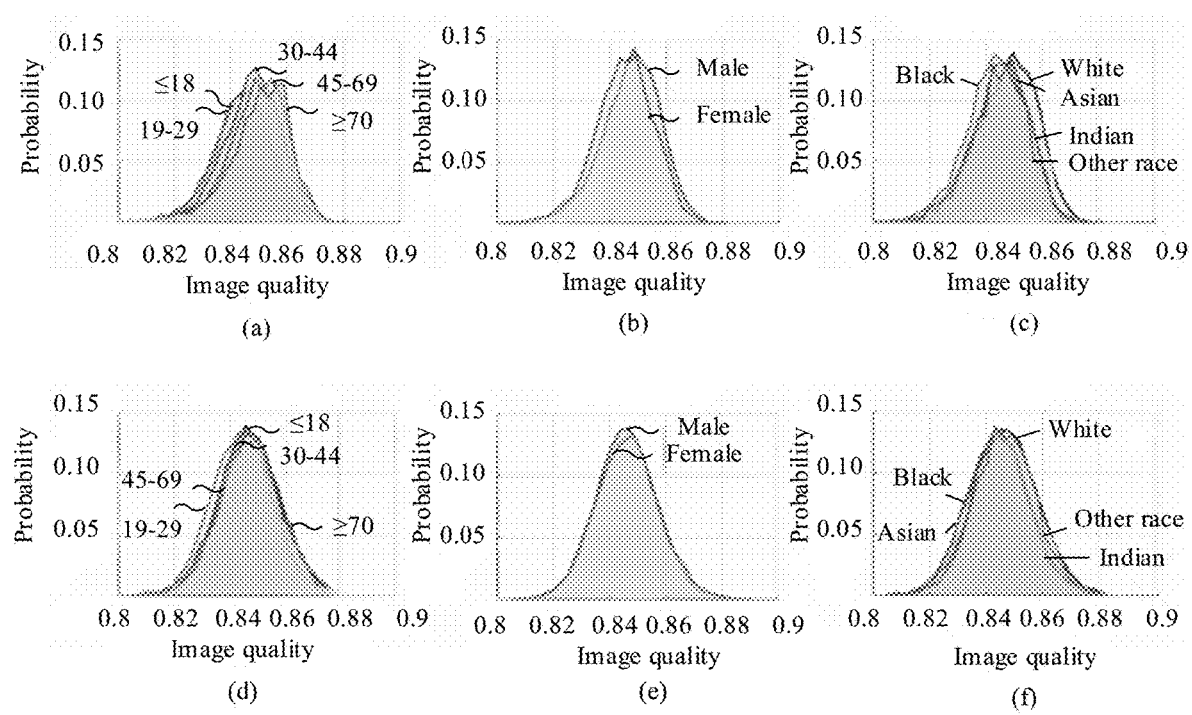
FIG. 13 is a schematic diagram of quality assessment result curves of quality assessment models obtained by training based on different methods in different application scenarios according to an exemplary embodiment of this disclosure.

Moreover, in order to further verify the accuracy of the quality assessment model obtained by training based on the SDD-FIQA method provided in this disclosure for personal images with different attributes, the quality assessment model obtained by training based on the SDD-FIQA method provided in this disclosure and a quality assessment model obtained by training based on a face image quality-Stochastic embedding robustness (SER-FIQ) method are applied to different application scenarios, and their quality assessment results are compared. FIG. 13 is a schematic diagram of quality assessment result curves of quality assessment models obtained by training based on different methods in different application scenarios according to an exemplary embodiment of this disclosure. As shown in FIG. 13, the quality assessment results of the two models are compared from three attributes of age, gender, and skin color. FIGS. (a), (b), and (c) in FIG. 13 correspond to the quality assessment results of the quality assessment model obtained by training based on the SER-FIQ method under the three attributes of age, gender, and skin color, and FIGS. (d), (e), and (f) in FIG. 13 correspond to the quality assessment results of the quality assessment model obtained by training based on the SDD-FIQA method under the three attributes of age, gender, and skin color. As shown in FIG. 13, compared with the quality assessment result obtained by training based on the SER-FIQ method, quality assessment scores of the quality assessment model obtained by training based on the SDD-FIQA method provided in this disclosure are distributed more consistently. Therefore, the quality assessment model obtained by training based on the SDD-FIQA method provided in this disclosure is proved unbiased.

In summary, according to the face image quality assessment method provided in this embodiment of this disclosure, the quality assessment model to be trained is trained based on the similarity distribution distance of the sample image that is calculated based on the intra-person similarity distribution and inter-person similarity distribution corresponding to the sample image, and the image quality of the target face image is determined by use of the trained quality assessment model, so automatic acquisition of the image quality is implemented. In addition, the image quality is determined comprehensively from the two aspects of intra-person similarity and inter-person similarity, so the accuracy of acquiring the image quality is improved.

In addition, the similarity distribution distance of the sample image is acquired automatically during the training of the quality assessment model, so the image quality annotation cost is reduced, and the image quality annotation accuracy is improved.

Although the steps in the flowcharts of the embodiments are displayed sequentially, these steps are not necessarily performed sequentially. Unless otherwise explicitly specified in this specification, execution of the steps is not strictly limited, and the steps may be performed in other sequences. In addition, at least a part of the steps in the foregoing embodiments may include a plurality of substeps or a plurality of stages. These substeps or stages are not necessarily performed and completed at the same moment, and may be performed at different moments. Besides, the substeps or stages may not be necessarily performed sequentially, and may be performed in turn or alternately with other steps or at least a part of substeps or stages of other steps.

Figure 14:
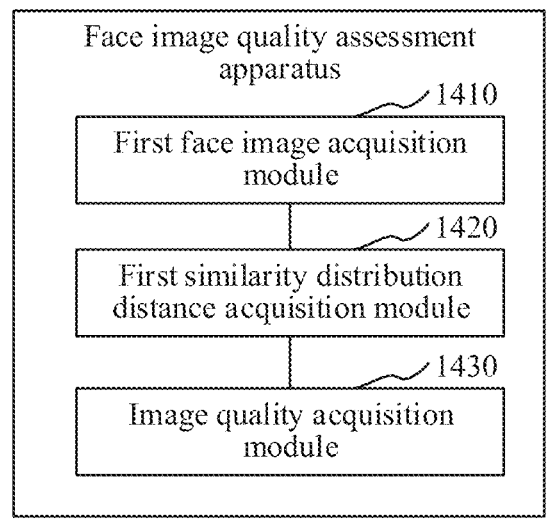
FIG. 14 is a block diagram of a face image quality assessment apparatus according to an exemplary embodiment of this disclosure.

FIG. 14 is a block diagram of a face image quality assessment apparatus according to an exemplary embodiment of this disclosure. The apparatus is applied to a computer device. The computer device may be implemented as a terminal or server. The terminal or server may be the terminal or server shown in FIG. 1. As shown in FIG. 14, the face image quality assessment apparatus includes: a first face image acquisition module 1410, configured to acquire a target face image; a first similarity distribution distance acquisition module 1420, configured to determine a similarity distribution distance of the target face image, the similarity distribution distance including a distribution distance between an intra-person similarity distribution corresponding to the target face image and an inter-person similarity distribution corresponding to the target face image, the intra-person similarity distribution being used for indicating a similarity distribution between the target face image and a first-type image, the first-type image being a face image corresponding to a same personal identity as the target face image, the inter-person similarity distribution being used for indicating a similarity distribution between the target face image and a second-type image, and the second-type image being a face image corresponding to a different personal identity from the target face image; and an image quality acquisition module 1430, configured to determine image quality of the target face image based on the similarity distribution distance of the target face image.

In an embodiment, the first similarity distribution distance acquisition module 1420 is further configured to input the target face image to a trained quality assessment model to obtain the similarity distribution distance of the target face image outputted by the trained quality assessment model, the trained quality assessment model being obtained by training based on sample images and similarity distribution distances of the sample images.

In an embodiment, the first face image acquisition module 1410 is further configured to acquire respective face images, the respective face images including face image sets corresponding to at least two personal identities respectively, and the face image set including at least two face images; determine similarity distribution distances of the respective face images respectively based on the respective face images and the personal identities corresponding to the respective face images; and determine the respective face images as the sample images, and determine the similarity distribution distances of the respective face images as the similarity distribution distances of the sample images.

In an embodiment, the first face image acquisition module 1410 is further configured to perform feature extraction on the respective face images to obtain image features of the respective face images; and determine a similarity between every two of the respective face images based on the image features of the respective face images. A similarity distribution distance acquisition submodule is configured to acquire the similarity distribution distances of the respective face images based on the similarity between every two of the respective face images and the personal identities corresponding to the respective face images.

In an embodiment, the first face image acquisition module 1410 is further configured to acquire a first similarity set between a first face image and a face image corresponding to a same personal identity in other images, the first face image being any one of the respective face images, the other images being the face images in the respective face images except the first face image, and the face image corresponding to the same personal identity being a face image corresponding to the same personal identity as the first face image in the other images; acquire a second similarity set between the first face image and a face image corresponding to a different personal identity in the other images, the face image corresponding to the different personal identity being a face image corresponding to a different personal identity from the first face image in the other images; and determine a similarity distribution distance of the first face image based on the first similarity set and the second similarity set.

In an embodiment, the first face image acquisition module 1410 is further configured to process the respective face images through a feature extraction part in a face recognition model to obtain the image features of the respective face images.

In an embodiment, the first face image acquisition module 1410 is further configured to input, in a case that the image quality of the target face image is greater than a preset image quality threshold, the target face image to a face recognition model to obtain the personal identity corresponding to the target face image.

In an embodiment, the first face image acquisition module 1410 is further configured to input the sample image to a quality assessment model to be trained to obtain a predicted distribution distance of the sample image outputted by the quality assessment model to be trained; input the similarity distribution distance and predicted distribution distance of the sample image to a loss function to obtain a loss function value; and perform, based on the loss function value, parameter updating on the quality assessment model to be trained to obtain the trained quality assessment model.

In an embodiment, the loss function includes at least one of the following functions: mean squared error, mean absolute error, and a regression loss function.

In an embodiment, the similarity distribution distance includes at least one of a maximum mean discrepancy, a minimum Euclidean distance, a mean average distance, a medium distance, and a Wasserstein distance.

In summary, the face image quality assessment apparatus provided in this embodiment of this disclosure is applied to a computer device, and may determine the image quality of the target face image based on the distribution distance between the intra-person similarity distribution and inter-person similarity distribution corresponding to the target face image, so automatic acquisition of the image quality is implemented. In addition, the image quality is determined comprehensively from the two aspects of intra-person similarity and inter-person similarity, so the accuracy of acquiring the image quality is improved.

Figure 15:
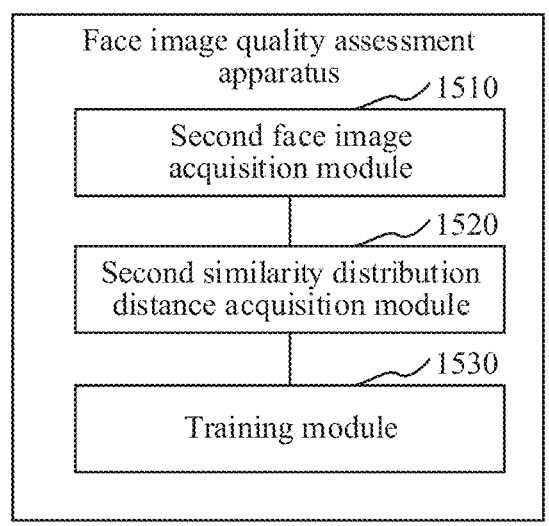
FIG. 15 is a block diagram of a face image quality assessment apparatus according to an exemplary embodiment of this disclosure.

FIG. 15 is a block diagram of a face image quality assessment apparatus according to an exemplary embodiment of this disclosure. The apparatus is applied to a computer device. The computer device may be implemented as a terminal or server. The terminal or server may be the terminal or server shown in FIG. 1. As shown in FIG. 15, the face image quality assessment apparatus includes: a second face image acquisition module 1510, configured to acquire a sample image, the sample image including a face image set corresponding to at least two personal identities respectively, and the face image set including at least two face images; a second similarity distribution distance acquisition module 1520, configured to determine a similarity distribution distance of the sample image based on the sample image and a personal identity corresponding to the sample image, the similarity distribution distance of the sample image including a distribution distance between an intra-person similarity distribution corresponding to the sample image and an inter-person similarity distribution corresponding to the sample image, the intra-person similarity distribution corresponding to the sample image being used for indicating a similarity distribution between the sample image and a first-type image, the first-type image being a face image corresponding to the same personal identity as the sample image, the inter-person similarity distribution corresponding to the sample image being used for indicating a similarity distribution between the sample image and a second-type image, and the second-type image being a face image corresponding to a different personal identity from the sample image; and a training module 1530, configured to train a quality assessment model to be trained based on the sample image and the similarity distribution distance of the sample image to obtain a trained quality assessment model, the trained quality assessment model being used for processing an input target face image and outputting a similarity distribution distance of the target face image, and the similarity distribution distance of the target face image being used for quality assessment of the target face image.

In summary, according to the face image quality assessment apparatus provided in this embodiment of this disclosure, the quality assessment model to be trained is trained based on the sample image and the similarity distribution distance of the sample image that is calculated based on the intra-person similarity distribution and inter-person similarity distribution corresponding to the sample image, and the image quality of the target face image is determined by use of the trained quality assessment model, so automatic acquisition of the image quality is implemented. In addition, the image quality is determined comprehensively from the two aspects of intra-person similarity and inter-person similarity, so the accuracy of acquiring the image quality is improved.

In addition, the similarity distribution distance of the sample image is acquired automatically during the training of the quality assessment model, so the image quality annotation cost is reduced, and the image quality annotation accuracy is improved.

Figure 16:
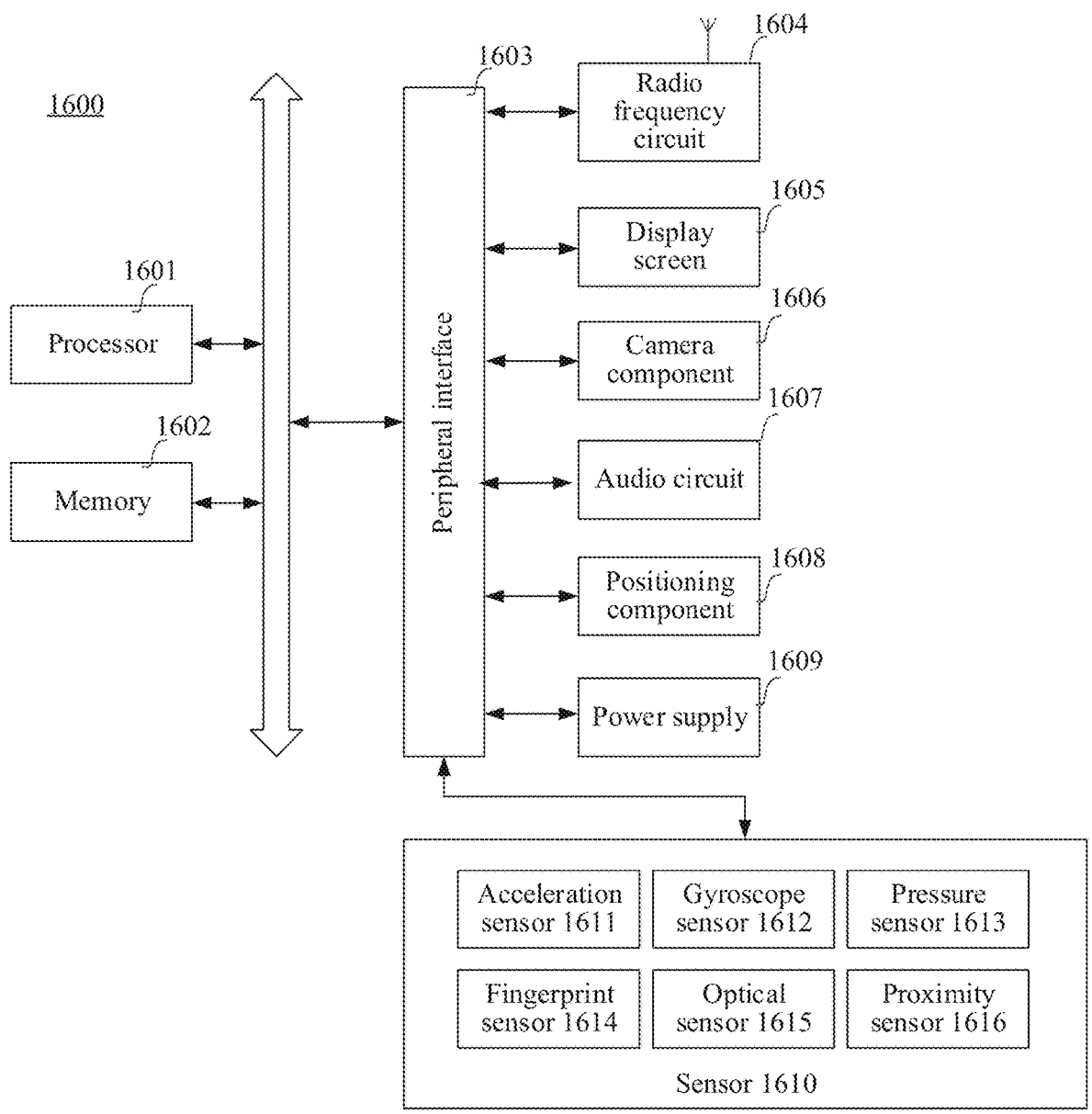
FIG. 16 is a structural block diagram of a computer device according to an exemplary embodiment of this disclosure.

FIG. 16 is a structural block diagram of a computer device 1600 according to an exemplary embodiment of this disclosure. The computer device 1600 may be implemented as the above-mentioned face quality assessment device and/or quality assessment model training device, such as a smartphone, a tablet computer, a notebook computer, or a desktop computer. The computer device 1600 may be further referred to as another name such as user equipment, a portable terminal, a laptop terminal, or a desktop terminal.

Generally, the computer device 1600 includes a processor 1601 (including processing circuitry) and a memory 1602 (including a non-transitory computer-readable storage medium).

The processor 1601 may include one or more processing cores, and may be, for example, a 4-core processor or a 16-core processor. The processor 1601 may be implemented by at least one hardware form in a digital signal processing (DSP), a field-programmable gate array (FPGA), and a programmable logic array (PLA). the processor 1601 further includes a main processor and a coprocessor. The main processor is configured to process data in an active state, also referred to as a central processing unit (CPU); the coprocessor is a low-power processor configured to process data in a standby state. In some embodiments, the processor 1601 may be integrated with a graphics processing unit (GPU). The GPU is configured to render and draw content that needs to be displayed on a display screen. In some embodiments, the processor 1601 may further include an artificial intelligence (AI) processor. The AI processor is configured to process a computing operation related to machine learning.

The memory 1602 may include one or more computer-readable storage media. The computer-readable storage media may be non-transitory. The memory 1602 may also include a high-speed random access memory, as well as non-volatile memory, such as one or more disk storage devices and flash storage devices. In some embodiments, a non-transitory computer-readable storage medium in the memory 1602 is configured to store at least one instruction, the at least one instruction being configured to be executed by the processor 1601 to implement the face image quality assessment method provided in the method embodiments of this disclosure.

In some embodiments, the computer device 1600 further includes a peripheral interface 1603 and at least one peripheral. The processor 1601, the memory 1602, and the peripheral interface 1603 may be connected through a bus or a signal cable. Each peripheral may be connected to the peripheral interface 1603 through a bus, a signal cable, or a circuit board. Specifically, the peripherals include: at least one of a radio frequency (RF) circuit 1604, a display screen 1605, a camera assembly 1606, an audio circuit 1607, a positioning assembly 1608, and a power supply 1609.

The peripheral interface 1603 may be configured to connect at least one input/output (I/O)-related peripheral to the processor 1601 and the memory 1602. In some embodiments, the processor 1601, the memory 1602, and the peripheral interface 1603 are integrated on the same chip or the same circuit board; In some other embodiments, any or both of the processor 1601, the memory 1602, and the peripheral interface 1603 may be implemented on an independent chip or circuit board. This is not limited in this embodiment.

In some embodiments, the computer device 1600 may also include one or more sensors 1610. The one or more sensors 1610 include, but are not limited to: an acceleration sensor 1611, a gyroscope sensor 1612, a pressure sensor 1613, a fingerprint sensor 1614, an optical sensor 1615, and a proximity sensor 1616.

A person skilled in the art may understand that the structure shown in FIG. 16 does not constitute any limitation on the computer device 1600, and the computer device may include more components or fewer components than those shown in the figure, or some components may be combined, or a different component deployment may be used.

Figure 17:
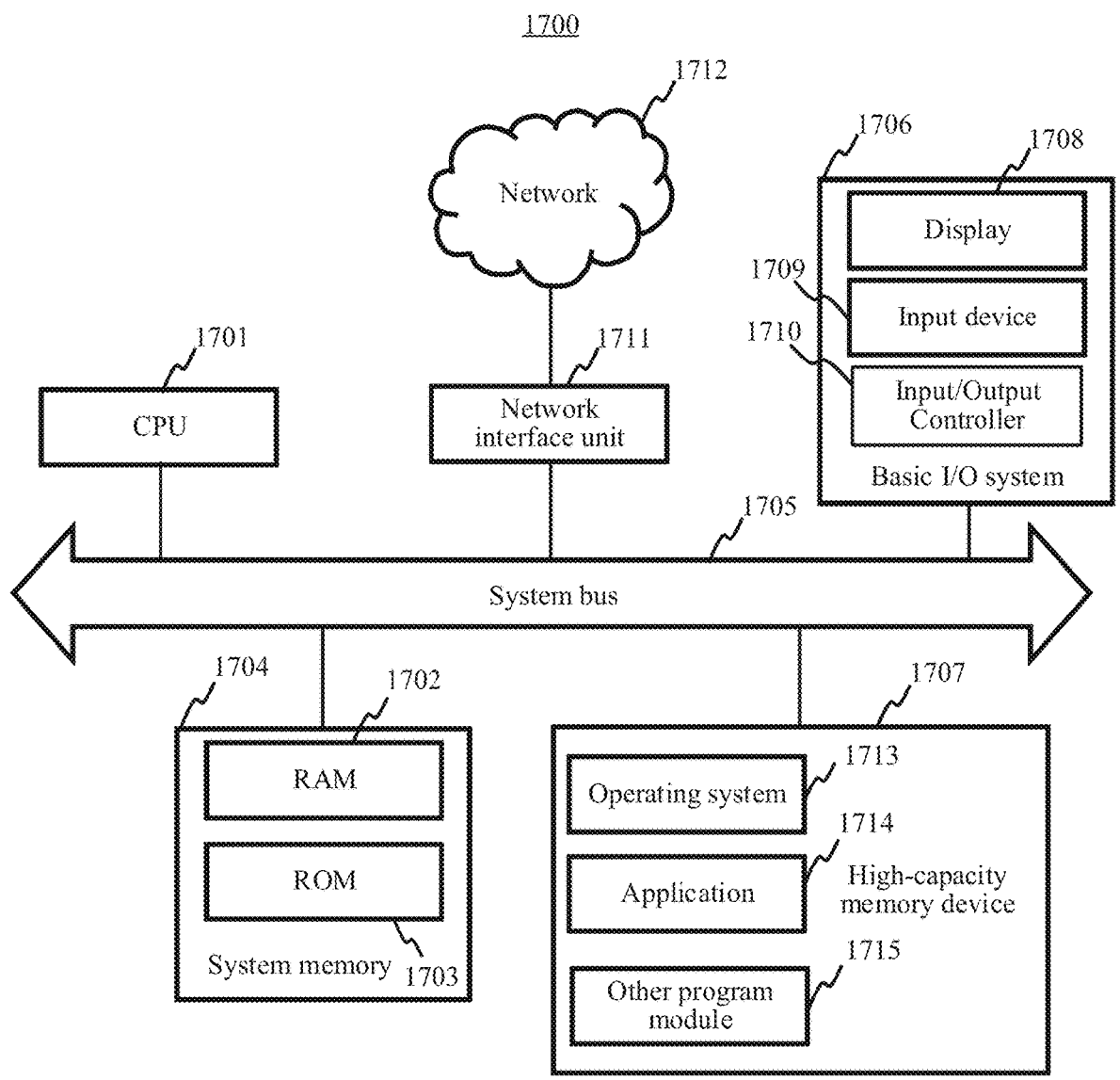
FIG. 17 is a structural block diagram of a computer device according to an exemplary embodiment of this disclosure.

FIG. 17 is a structural block diagram of a computer device 1700 according to an exemplary embodiment of this disclosure. The computer device may be implemented as the face quality assessment device and/or quality assessment model training device in the above solution of this disclosure. The computer device 1700 includes a central processing unit (CPU) 1701, a system memory 1704 including a random access memory (RAM) 1702 and a read-only memory (ROM) 1703, and a system bus 1705 connecting the system memory 1704 to the CPU 1701. The computer device 1700 further includes a basic input/output system (I/O) 1706 configured to transmit information between components in the computer, and a mass storage device 1707 configured to store an operating system 1713, an application program 1714, and other program module 1715.

The basic input/output system 1706 includes a display 1708 configured to display information and an input device 1709 such as a mouse and a keyboard for a user to input information. The display 1708 and the input device 1709 are both connected to the central processing unit 1701 through an input/output controller 1710 connected to the system bus 1705. The basic input/output system 1706 may further include the input/output controller 1710 for receiving and processing input from a plurality of other devices such as a keyboard, a mouse, an electronic stylus, or the like. Similarly, the input/output controller 1710 further provides output to a display screen, a printer, or other types of output devices.

The mass storage device 1707 is connected to the central processing unit 1701 through a mass storage controller (not shown) connected to the system bus 1705. The mass storage device 1707 and an associated computer-readable medium provide non-volatile storage for the computer device 1700. That is, the mass storage device 1707 may include a computer-readable medium (not shown) such as a hard disk or a compact disc ROM (CD-ROM) drive.

In general, the computer-readable medium may include a computer storage medium and a communication medium. The computer storage medium includes volatile and non-volatile, removable and non-removable media that are configured to store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, CD-ROM, a digital versatile disc (DVD) or another optical memory, a tape cartridge, a magnetic cassette, a magnetic disk memory, or another magnetic storage device. Certainly, those skilled in the art may learn that the computer storage medium is not limited to the above. The foregoing system memory 1704 and mass storage device 1707 may be collectively referred to as a memory.

According to the embodiments of this disclosure, the computer device 1700 may further be connected, through a network such as the Internet, to a remote computer on the network. That is, the computer device 1700 may be connected to a network 1712 by using a network interface unit 1711 connected to the system bus 1705, or may be connected to another type of network or a remote computer system (not shown) by using a network interface unit 1711.

The memory further includes at least one instruction, at least one program, and a code set or an instruction set, and the at least one instruction, the at least one program, and the code set or the instruction set is stored in the memory, and through performing the at least one instruction, the at least one program, and the code set or the instruction set, the central processing unit 1701 implements all or some steps of the face image quality assessment method in the foregoing embodiments.

In an exemplary embodiment, one or more computer-readable storage medium is further provided, storing at least one computer-readable instructions, the computer-readable instructions being loaded and executed by a processor to implement all or some steps of the method in the foregoing embodiments in FIG. 2, FIG. 5, and FIG. 6. For example, the non-transitory computer-readable storage medium may be a ROM, a RAM, a CD-ROM, a magnetic tape, a floppy disk, and an optical data storage device.

For example, a non-transitory computer-readable storage medium may store computer-readable instructions thereon, which, when executed by a computer device, cause the computer device to perform a face image quality assessment method. The face image quality assessment method includes acquiring a face image, and determining a similarity distribution distance of the face image, the similarity distribution distance comprising a distribution distance between an intra-person similarity distribution of the face image and an inter-person similarity distribution of the face image. The intra-person similarity distribution indicates a similarity distribution between the face image and a first-type image of a same person as the face image, the inter-person similarity distribution indicates a similarity distribution between the face image and a second-type image of a different person from the face image. The method further includes determining image quality of the face image based on the similarity distribution distance of the face image.

For example, a non-transitory computer-readable storage medium may store computer-readable instructions thereon, which, when executed by a computer device, cause the computer device to perform a face image quality assessment method. The face image quality assessment method includes acquiring sample images, the sample images including face image sets, each of the face image sets corresponding to a personal identity respectively. Each face image set includes at least two face images. The method further includes determining a similarity distribution distance of each of the sample images based on the respective sample image and a personal identity corresponding to a face image set of the respective sample image. The similarity distribution distance of the respective sample image includes a distribution distance between an intra-person similarity distribution of the respective sample image and an inter-person similarity distribution of the respective sample image. The intra-person similarity distribution indicates a similarity distribution between the respective sample image and a first-type image of a same person as the respective sample image, the inter-person similarity distribution indicates a similarity distribution between the respective sample image and a second-type image of a different person from the respective sample image. The method further includes providing the sample images and the similarity distribution distances of the sample images to a quality assessment model.

In an exemplary embodiment, a computer program product or a computer program is provided. The computer program product or the computer program includes computer-readable instructions, and the computer-readable instructions are stored in a computer-readable storage medium. A processor of a computer device reads the computer-readable instructions from the computer-readable storage medium, and executes the computer-readable instructions, to cause the computer device to perform all or some steps of the method shown in any embodiment in FIG. 2, FIG. 5, or FIG. 6.

Other embodiments of this disclosure will be apparent to a person skilled in the art from consideration of the specification and practice of the disclosure here. This disclosure is intended to cover any variation, use, or adaptive change of this disclosure. These variations, uses, or adaptive changes follow the general principles of this disclosure and include common general knowledge or common technical means in the art that are not disclosed in this disclosure. The specification and the embodiments are considered as merely exemplary, and the scope and spirit of the present disclosure are pointed out in the following claims.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A face image quality assessment method, comprising:
   acquiring a face image;
   determining a similarity distribution distance of the face image, the similarity distribution distance comprising a distribution distance between an intra-person similarity distribution of the face image and an inter-person similarity distribution of the face image, the intra-person similarity distribution indicating a similarity distribution between the face image and a first-type image of a same person as the face image, the inter-person similarity distribution indicating a similarity distribution between the face image and a second-type image of a different person from the face image; and
   determining image quality of the face image based on the similarity distribution distance of the face image.

2. The method according to claim 1, wherein the determining the similarity distribution distance comprises:
   inputting the face image to a quality assessment model to obtain the similarity distribution distance of the face image outputted by the quality assessment model.

3. The method according to claim 1, further comprising:
   inputting, in response to a determination that the image quality of the face image is greater than a preset image quality threshold, the face image to a face recognition model to obtain an identity of the person in the face image.

4. The method according to claim 1, wherein the similarity distribution distance comprises:
at least one of a maximum mean discrepancy, a minimum Euclidean distance, a mean average distance, a medium distance, or a Wasserstein distance.

5. A face image quality assessment method, comprising:
acquiring sample images, the sample images comprising face image sets, each of the face image sets corresponding to a personal identity respectively, and each face image set comprising at least two face images;
determining a similarity distribution distance of each of the sample images based on the respective sample image and a personal identity corresponding to a face image set of the respective sample image, the similarity distribution distance of the respective sample image comprising a distribution distance between an intra-person similarity distribution of the respective sample image and an inter-person similarity distribution of the respective sample image, the intra-person similarity distribution indicating a similarity distribution between the respective sample image and a first-type image of a same person as the respective sample image, the inter-person similarity distribution indicating a similarity distribution between the respective sample image and a second-type image of a different person from the respective sample image; and
providing the sample images and the similarity distribution distances of the sample images to a quality assessment model.

6. The method according to claim 5, wherein
the quality assessment model is trained based on the sample images and the similarity distribution distances of the sample images.

7. The method according to claim 6, wherein the determining the similarity distribution distances of each of the sample images comprises:
performing feature extraction on the sample images to obtain image features of the sample images;
determining a similarity between every combination of two of the sample images based on the image features of the two of the sample images; and
acquiring the similarity distribution distances of each of the sample images based on the determined similarities and the personal identity corresponding to a face image set of the respective one of the sample images.

8. The method according to claim 7, wherein the acquiring the similarity distribution distances of each of the sample images comprises:
acquiring a first similarity set between a first sample image and a second sample image corresponding to a same personal identity, the first sample image and the second sample image being different ones of the sample images;
acquiring a second similarity set between the first sample image and a third sample image corresponding to a different personal identity than the first sample image, the third sample image being one of the sample images; and
determining a similarity distribution distance of the first sample image based on the first similarity set and the second similarity set.

9. The method according to claim 7, wherein the performing the feature extraction comprises:

processing the sample images through a feature extraction function in a face recognition model to obtain the image features of the sample images.

10. The method according to claim 6, wherein the providing further comprises:
inputting each of the sample images to the quality assessment model to obtain a predicted distribution distance of the respective sample image outputted by the quality assessment model;
inputting the similarity distribution distance and the predicted distribution distance of the respective sample image to a loss function to obtain a loss function value; and
performing, based on the loss function value, parameter updating on the quality assessment model to train the quality assessment model.

11. The method according to claim 10, wherein the loss function comprises at least one of:
mean squared error, mean absolute error, or a regression loss function.

12. The method according to claim 5, wherein the similarity distribution distance comprises:
at least one of a maximum mean discrepancy, a minimum Euclidean distance, a mean average distance, a medium distance, or a Wasserstein distance.

13. A face image quality assessment apparatus, comprising:
processing circuitry configured to
acquire sample images, the sample images comprising a face image sets, each of the face image sets corresponding to a personal identity respectively, and each face image set comprising at least two face images;
determine a similarity distribution distance of each of the sample images based on the respective sample image and a personal identity corresponding to a face image set of the respective sample image, the similarity distribution distance of the respective sample image comprising a distribution distance between an intra-person similarity distribution of the respective sample image and an inter-person similarity distribution of the respective sample image, the intra-person similarity distribution indicating a similarity distribution between the respective sample image and a first-type image of a same person as the respective sample image, the inter-person similarity distribution indicating a similarity distribution between the respective sample image and a second-type image of a different person from the respective sample image; and
provide the sample images and the similarity distribution distances of the sample images to a quality assessment model.

14. The apparatus according to claim 13, wherein
the quality assessment model is trained based on the sample images and the similarity distribution distances of the sample images.

15. The apparatus according to claim 14, wherein the processing circuitry is further configured to
perform feature extraction on the sample images to obtain image features of the sample images;
determine a similarity between every combination of two of the sample images based on the image features of the sample images; and
acquire the similarity distribution distances of each of the sample images based on the determined similarities and the personal identity corresponding to a face image set of the respective one of the sample images.

16. The apparatus according to claim 15, wherein the processing circuitry is further configured to
   acquire a first similarity set between a first sample image and a second sample image corresponding to a same personal identity, the first sample image and the second sample image being different ones of the sample images;
   acquire a second similarity set between the first sample image and a third sample image corresponding to a different personal identity than the first sample image, the third sample image being one of the sample images; and
   determine a similarity distribution distance of the first sample image based on the first similarity set and the second similarity set.

17. The apparatus according to claim 15, wherein the processing circuitry is further configured to process the sample images through a feature extraction function in a face recognition model to obtain the image features of the sample images.

18. The apparatus according to claim 14, wherein the processing circuitry is further configured to
   input each of the sample images to the quality assessment model to obtain a predicted distribution distance of the respective sample image outputted by the quality assessment model;
   input the similarity distribution distance and the predicted distribution distance of the respective sample image to a loss function to obtain a loss function value; and
   perform, based on the loss function value, parameter updating on the quality assessment model to train the quality assessment model.

19. The apparatus according to claim 18, wherein the loss function comprises at least one of: mean squared error, mean absolute error, or a regression loss function.

20. The apparatus according to claim 13, wherein the similarity distribution distance comprises:
   at least one of a maximum mean discrepancy, a minimum Euclidean distance, a mean average distance, a medium distance, or a Wasserstein distance.

* * * * *